United States Patent
Bingham

(10) Patent No.: US 11,365,543 B2
(45) Date of Patent: Jun. 21, 2022

(54) SHEET MATERIAL, MOLD, AND METHODS OF MAKING AND USING THE SHEET MATERIAL AND MOLD

(71) Applicant: Rigidcore Group LLC, Canton, CT (US)

(72) Inventor: Robert J. Bingham, Canton, CT (US)

(73) Assignee: RigidCore Group LLC, Canton, CT (US)

( * ) Notice: Subject to any disclaimer, the term of this patent is extended or adjusted under 35 U.S.C. 154(b) by 592 days.

(21) Appl. No.: 16/311,430

(22) PCT Filed: Apr. 23, 2018

(86) PCT No.: PCT/US2018/028801
§ 371 (c)(1),
(2) Date: Dec. 19, 2018

(87) PCT Pub. No.: WO2018/200353
PCT Pub. Date: Nov. 1, 2018

(65) Prior Publication Data
US 2019/0194943 A1    Jun. 27, 2019

Related U.S. Application Data

(60) Provisional application No. 62/489,060, filed on Apr. 24, 2017.

(51) Int. Cl.
*B32B 27/08*    (2006.01)
*B32B 3/12*    (2006.01)
(Continued)

(52) U.S. Cl.
CPC .............. *E04C 2/365* (2013.01); *B29C 33/00* (2013.01); *B29C 33/424* (2013.01); *B29C 43/22* (2013.01);
(Continued)

(58) Field of Classification Search
CPC ..... B29C 33/424; B29C 33/42; B29C 43/222; B29C 45/04
See application file for complete search history.

(56) References Cited

U.S. PATENT DOCUMENTS 2,351,529 A    6/1944 Luxenberger et al.
2,642,624 A    6/1953 Marvin
(Continued)

FOREIGN PATENT DOCUMENTS

WO    0009307 A2    2/2000
WO    WO-0009307 A2 *    2/2000    ............. B29C 33/52

OTHER PUBLICATIONS

[NPL-1] Deshpande, V.S., Fleck, N.A., Ashby, M.F.; "Effective properties of the octet-truss lattice material"; Journal of the Mechanics and Physics of Solids, 49 (2001), pp. 1747-1769. (Year: 2001).*
(Continued)

*Primary Examiner* — Kelly M Gambetta
*Assistant Examiner* — Virak Nguon
(74) *Attorney, Agent, or Firm* — Alix, Yale & Ristas, LLP

(57) ABSTRACT

A one-piece component comprising a tetrahedral-octahedral honeycomb lattice is disclosed herein, along with a mold, a system and methods of making the component. A one-piece component comprising a truncated tetrahedral-octahedral honeycomb lattice also is disclosed, along with corresponding molds, systems and methods.

20 Claims, 31 Drawing Sheets

| | Total | | | FEA Study - Beam Load | | | FEA Study - Shear Load | | |
|---|---|---|---|---|---|---|---|---|---|
| Sample | LxW (in) | Thickness (in) | Weight (lbs) | Applied Force (lbs) | Max Stress (psi) | Max Displacement (in) | Applied Force (lbs) | Max Stress (psi) | Max Displacement (in) |
| 1 | 3 x 8 | 0.468 | 0.54 | 40 | 1081.5 | 0.00098 | 500 | 232.4 | 0.00023 |
| 2 | 3 x 8 | 0.474 | 0.52 | 40 | 1144.3 | 0.00113 | 500 | 273.7 | 0.00027 |
| 3 | 3 x 8 | 0.500 | 0.26 | 40 | 1969.2 | 0.00151 | 500 | 590.4 | 0.00038 |
| | | | | 80 | 3938.4 | 0.00302 | 1000 | 1180.8 | 0.00076 |
| | | | | 120 | 5907.7 | 0.00453 | 1500 | 1771.3 | 0.00114 |
| 4 | 3 x 8 | 0.500 | 0.24 | 40 | 1813.0 | 0.00187 | 500 | 490.2 | 0.00050 |
| 5 | 3 x 8 | 0.500 | 0.26 | 40 | 1721.9 | 0.00157 | 500 | 452.9 | 0.00040 |
| 6 | 3 x 8 | 0.500 | 0.22 | 40 | 2333.1 | 0.00247 | 500 | 400.5 | 0.00043 |
| 7 | 3 x 8 | 0.500 | 0.40 | 40 | 1265.5 | 0.00082 | 500 | 440.8 | 0.00015 |
| 8 | 3 x 8 | 0.500 | 0.23 | 40 | 1847.4 | 0.00204 | 500 | 452.2 | 0.00053 |

(51) Int. Cl.
*B33Y 80/00* (2015.01)
*B29C 33/00* (2006.01)
*B29C 45/04* (2006.01)
*B29C 43/22* (2006.01)
*B29C 45/37* (2006.01)
*B29C 33/42* (2006.01)
*B29K 301/00* (2006.01)
*E04C 2/36* (2006.01)
*E04C 2/32* (2006.01)

(52) U.S. Cl.
CPC ............ *B29C 43/222* (2013.01); *B29C 45/04* (2013.01); *B29C 45/372* (2013.01); *B32B 3/12* (2013.01); *B32B 27/08* (2013.01); *B33Y 80/00* (2014.12); *E04C 2/32* (2013.01); *B29K 2301/00* (2013.01)

(56) References Cited

U.S. PATENT DOCUMENTS

| | | | |
|---|---|---|---|
| 2,780,946 A | 2/1957 | McGuire | |
| 3,319,703 A | 5/1967 | Heim | |
| 3,354,591 A | 11/1967 | Fuller | |
| 3,642,566 A * | 2/1972 | Figge | E04C 2/326 428/180 |
| 3,645,833 A | 2/1972 | Figge | |
| 3,657,059 A | 4/1972 | Figge | |
| 3,689,345 A | 9/1972 | Figge et al. | |
| 3,811,645 A | 5/1974 | Feist | |
| 3,914,486 A | 10/1975 | Borgford | |
| 3,932,106 A | 1/1976 | Vogts | |
| 4,020,205 A | 4/1977 | Haselbauer | |
| 4,158,537 A | 6/1979 | Cuff et al. | |
| 4,241,117 A | 12/1980 | Figge | |
| 4,348,442 A | 9/1982 | Figge | |
| 4,838,176 A | 6/1989 | Bowser, Sr. et al. | |
| 4,923,544 A | 5/1990 | Weisse | |
| 4,965,138 A * | 10/1990 | Gonzalez | B62D 25/2054 428/593 |
| 4,967,533 A | 11/1990 | Weisse | |
| 5,005,800 A | 4/1991 | Weisse | |
| 5,040,966 A | 8/1991 | Weisse | |
| 5,070,673 A | 12/1991 | Weisse | |
| 5,071,331 A | 12/1991 | Falco | |
| 5,266,379 A | 11/1993 | Schaeffer et al. | |
| 5,300,263 A | 4/1994 | Hoopman et al. | |
| 5,759,592 A | 6/1998 | Piramoon et al. | |
| 5,906,839 A | 5/1999 | Miura et al. | |
| 5,919,493 A | 7/1999 | Sheppard et al. | |
| 5,930,970 A | 8/1999 | De Le Fevre | |
| 6,026,527 A | 2/2000 | Pearce | |
| 6,117,518 A * | 9/2000 | Cawse | B29C 70/088 428/116 |
| 6,200,664 B1 | 3/2001 | Figge et al. | |
| 6,293,779 B1 | 9/2001 | Firmin | |
| 6,413,458 B1 | 7/2002 | Pearce | |
| 6,451,235 B1 | 9/2002 | Owens | |
| 6,543,755 B2 | 4/2003 | Monson et al. | |
| 6,641,897 B2 | 11/2003 | Gervasi | |
| 6,749,418 B2 | 6/2004 | Muirhead | |
| 6,875,298 B2 | 4/2005 | Ickinger | |
| 7,060,213 B2 | 6/2006 | Pearce | |
| 7,076,822 B2 | 7/2006 | Pearce | |
| 7,229,578 B2 | 6/2007 | Johnson et al. | |
| 7,591,114 B2 | 9/2009 | Herron, III | |
| 8,157,608 B1 | 4/2012 | Stapleton | |
| 8,449,707 B2 | 5/2013 | Simmons et al. | |
| 8,628,321 B2 | 1/2014 | Jenkins et al. | |
| 8,650,756 B2 | 2/2014 | Wadley et al. | |
| 8,745,958 B2 | 6/2014 | Kang et al. | |
| 9,230,227 B2 | 1/2016 | Muirhead | |
| 9,361,553 B1 | 6/2016 | Ito | |
| 9,405,043 B2 | 8/2016 | Isurugi et al. | |
| 2008/0289274 A1 | 11/2008 | Dobbin et al. | |
| 2011/0111080 A1 | 5/2011 | Wang et al. | |
| 2014/0352870 A1 | 12/2014 | Kanai et al. | |
| 2016/0046095 A1 | 2/2016 | Clough et al. | |
| 2016/0115822 A1 | 4/2016 | Cortequisse | |
| 2017/0029968 A1 | 2/2017 | Wadley et al. | |
| 2017/0080673 A1* | 3/2017 | Schaedler | C23F 1/00 |

OTHER PUBLICATIONS

Deshpande, V.S. et al., "Effective properties of the octet-truss lattice material," Journal of the Mechanics and Physics of Solids, vol. 49, p. 1747-69 (2001).

Meza, Lucas R. et al., "Strong, lightweight, and recoverable three-dimensional ceramic nanolattices," Science, vol. 345, issue 6202, p. 1322-26 (Sep. 12, 2014).

International Search Report and Written Opinion dated Sep. 13, 2018 (PCT/US2018/028801).

Contuzzi, Nicola et al., "Manufacturing and Characterization of 18Ni Marage 300 Lattice Components by Selective Laser Melting," Materials, 6(8), 3451-3468 (2013).

* cited by examiner

10

10

220

|   | Core | | | | | Skin | |
|---|---|---|---|---|---|---|---|
|   | Type | Cell (in) | Cell Thk (in) | Truncation | Thickness (in) | Weight (lbs) | Thickness (in) | Weight (lbs) |
| 1 | Nontruncated | 0.500 | 0.050 | None | 0.343 | 0.240 | 0.0625 | 0.30 |
| 2 | Nontruncated | 0.500 | 0.040 | None | 0.349 | 0.220 | 0.0625 | 0.30 |
| 3 | Nontruncated | 0.500 | 0.040 | None | 0.436 | 0.120 | 0.032 | 0.14 |
| 4 | Truncated | 0.625 | 0.040 | 25% | 0.436 | 0.100 | 0.032 | 0.14 |
| 5 | Truncated | 0.625 | 0.050 | 25% | 0.436 | 0.119 | 0.032 | 0.14 |
| 6 | Truncated | 0.800 | 0.040 | 60% | 0.436 | 0.077 | 0.032 | 0.14 |
| 7 | Nontruncated | 0.213 | 0.040 | N/A | 0.213 | 0.240 | 0.032 | 0.16 |
| 8 | Truncated | 0.800 | 0.050 | 60% | 0.436 | 0.095 | 0.032 | 0.14 |

Fig. 19

| Sample | Total | | | FEA Study - Beam Load | | | FEA Study - Shear Load | | |
|---|---|---|---|---|---|---|---|---|---|
| | LxW (in) | Thickness (in) | Weight (lbs) | Applied Force (lbs) | Max Stress (psi) | Max Displacement (in) | Applied Force (lbs) | Max Stress (psi) | Max Displacement (in) |
| 1 | 3 x 8 | 0.468 | 0.54 | 40 | 1081.5 | 0.00098 | 500 | 232.4 | 0.00023 |
| 2 | 3 x 8 | 0.474 | 0.52 | 40 | 1144.3 | 0.00113 | 500 | 273.7 | 0.00027 |
| 3 | 3 x 8 | 0.500 | 0.26 | 40 | 1969.2 | 0.00151 | 500 | 590.4 | 0.00038 |
| | | | | 80 | 3938.4 | 0.00302 | 1000 | 1180.8 | 0.00076 |
| | | | | 120 | 5907.7 | 0.00453 | 1500 | 1771.3 | 0.00114 |
| 4 | 3 x 8 | 0.500 | 0.24 | 40 | 1813.0 | 0.00187 | 500 | 490.2 | 0.00050 |
| 5 | 3 x 8 | 0.500 | 0.26 | 40 | 1721.9 | 0.00157 | 500 | 452.9 | 0.00040 |
| 6 | 3 x 8 | 0.500 | 0.22 | 40 | 2333.1 | 0.00247 | 500 | 400.5 | 0.00043 |
| 7 | 3 x 8 | 0.500 | 0.40 | 40 | 1265.5 | 0.00082 | 500 | 440.8 | 0.00015 |
| 8 | 3 x 8 | 0.500 | 0.23 | 40 | 1847.4 | 0.00204 | 500 | 452.2 | 0.00053 |

Fig. 20

SHEET MATERIAL, MOLD, AND METHODS OF MAKING AND USING THE SHEET MATERIAL AND MOLD

BACKGROUND

While many core producers have been aware of the isotropic strength properties inherent in a Tetrahedral-Octahedral Honeycomb Lattice-based core material, most of the manufacturing processes proposed/employed to date involve molding a top and bottom sheet of material with tetrahedral elements and bonding them together to create a multi-piece core/lattice. U.S. Pat. Nos. 3,642,566 and 3,689,345 disclose known processes that involve connecting two sheets to form a core material. This approach runs the risk of core failure due to delamination and is difficult and expensive to manufacture. Alternatively, filament winding has been proposed, as is described in U.S. Pat. Nos. 3,657,059 and 3,645,833, but this too is time consuming and expensive. Further efforts to produce isotropic core material are described in U.S. Pat. No. 4,020,205, which describes manufacturing the core material by bending continuous strips of ribbon having lateral offset sections to form triangular sides and occluded dihedral angles of alternating tetrahedrons and octahedrons.

The interest in and use of lightweight composite materials has steadily grown over the last 40 years driven by the need to reduce weight in a range of structural products used by the marine, aerospace and transportation industries, among others. Common core materials used in composites include foam, aluminum honeycomb, Nomex honeycomb, balsa wood, and plywood among others. While each of these core materials has satisfied the needs of various applications, there remains a need for a lightweight, isotropic or quasi-isotropic, inherently rigid, core material that can be molded at low cost and in high volume.

SUMMARY

One embodiment described herein is a one-piece component comprising a tetrahedral-octahedral honeycomb lattice.

Another embodiment is a one-piece component comprising a truncated tetrahedral-octahedral honeycomb lattice. Yet another embodiment is a structure that includes a one-piece component comprising a tetrahedral-octahedral honeycomb lattice and/or a truncated tetrahedral-octahedral honeycomb lattice A further embodiment is a mold configured to form a one-piece component comprising a tetrahedral-octahedral honeycomb lattice and/or a truncated tetrahedral-octahedral honeycomb lattice. In embodiments, the mold includes a first portion with a base having a first set of tetrahedral and inclined pyramidal protrusions formed thereon, and a second portion with a base having a second set of tetrahedral and inclined pyramidal protrusions formed thereon, wherein the first and second sets of tetrahedral and pyramidal protrusions are complementary, and wherein the inclined pyramidal protrusions comprise a rectangular first surface portion and triangular second, third and fourth surface portions. In embodiments, during use, the rectangular first surface portion of each inclined pyramidal protrusion formed on the first portion of the mold is adjacent to and in contact with a rectangular first surface portion of an inclined pyramidal protrusion formed on the second portion of the mold. In embodiments, the first and second portions of the mold are configured to separate in opposite diagonal directions that are parallel to the plane of the rectangular first surface portions of the inclined pyramidal protrusions.

Yet another embodiment is an apparatus comprising a first portion with a base having a first set of tetrahedral and inclined pyramidal protrusions formed thereon, and a second portion with a base having a second set of tetrahedral and pyramidal protrusions formed thereon, wherein the first and second sets of tetrahedral and pyramidal protrusions are complementary and positioned adjacent to one another, forming a lattice-shaped void therebetween, and wherein the inclined pyramidal protrusions comprise a rectangular first surface portion and triangular second, third and fourth surface portions.

A further embodiment is a method of making a component, comprising obtaining a mold comprising the apparatus described in the previous paragraph, filling the mold with a liquid or molten moldable material, allowing the moldable material to solidify to form the component, and removing the component from the mold. In embodiments, the moldable material comprises at least one of a thermoplastic polymer and a thermoset polymer. In embodiments, the component is post-treated.

Another embodiment is a method of forming a component comprising a tetrahedral-octahedral honeycomb lattice or a truncated tetrahedral-octahedral honeycomb lattice using additive manufacturing. In embodiments, the component is post-treated. A further embodiment is a tetrahedral-octahedral honeycomb lattice or a truncated tetrahedral-octahedral honeycomb lattice formed by additive manufacturing.

BRIEF DESCRIPTION OF THE DRAWINGS

FIG. 19 is a table showing simulation data for non-truncated and truncated sandwich core material.

FIG. 20 is a table showing simulation data, including beam load and shear load data for non-truncated and truncated sandwich core material.

DETAILED DESCRIPTION

Figure 1:
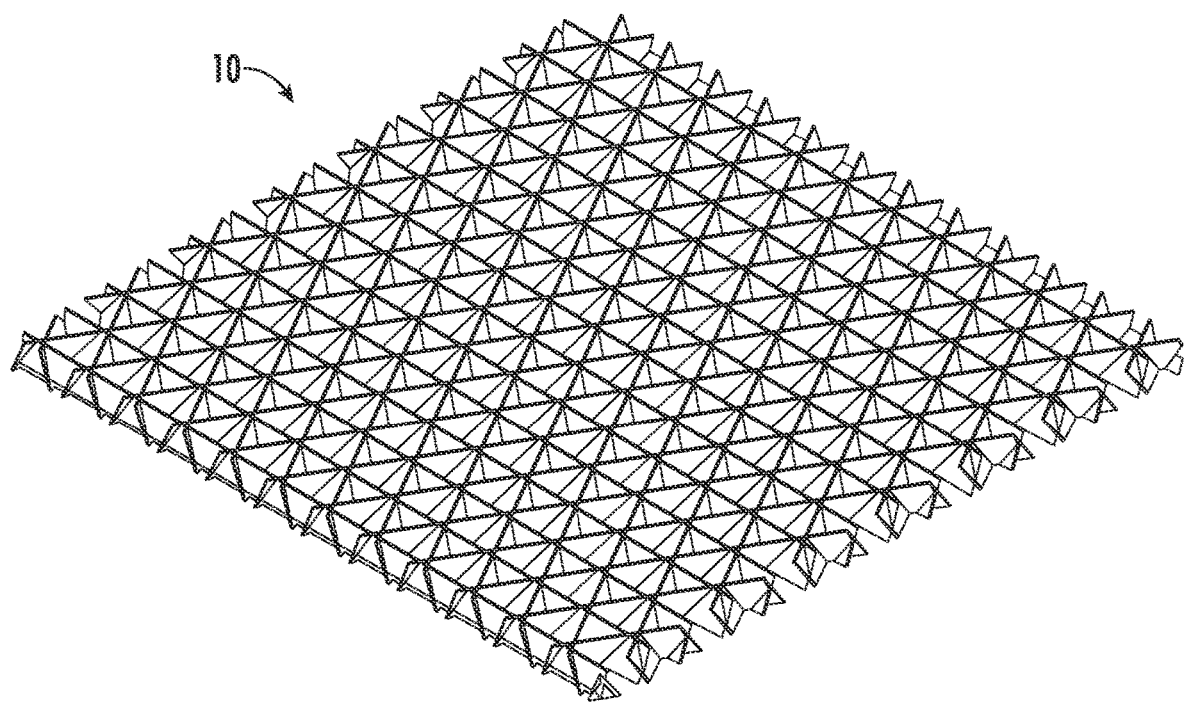
FIG. 1 shows a perspective view of a sheet according to a first embodiment.
Figure 2A:
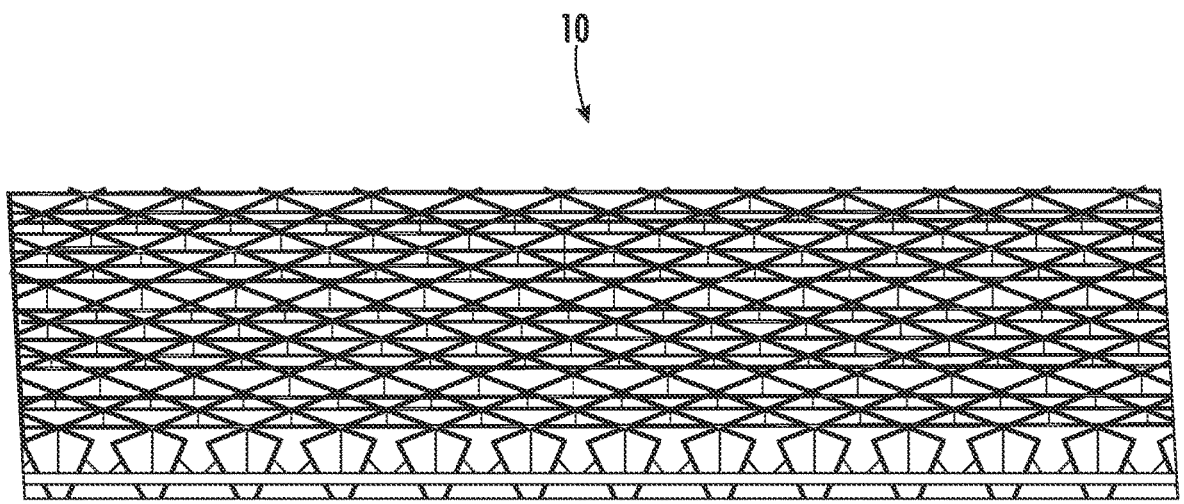
FIGS. 2A-2D show symmetric side views of the sheet of FIG. 1.
Figure 2B:
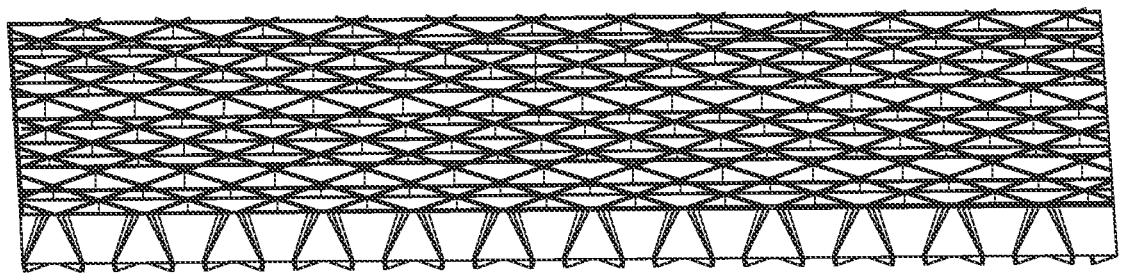
Figure 2C:
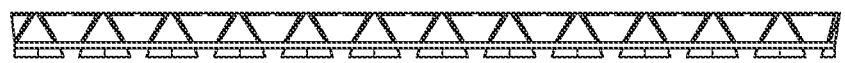
Figure 2D:
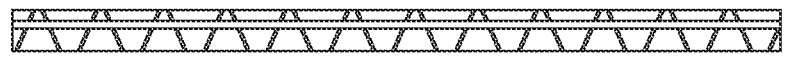
Figure 2E:
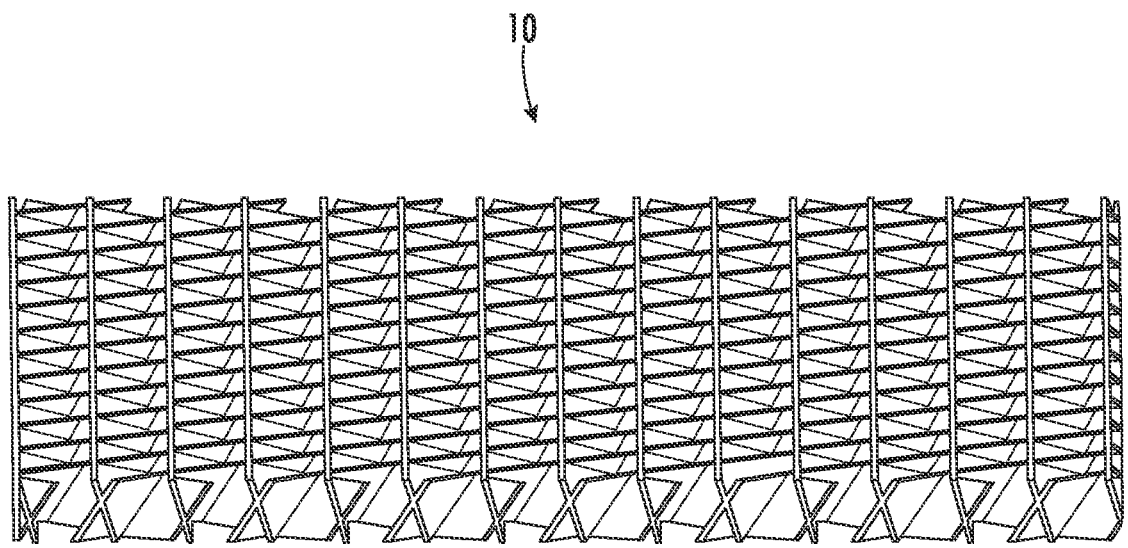
FIGS. 2E-2G show asymmetric side views of the sheet of FIG. 1.
Figure 2F:
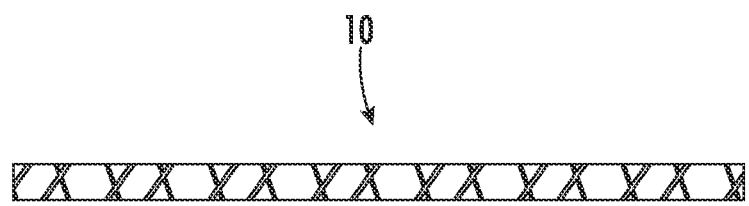
Figure 2G:
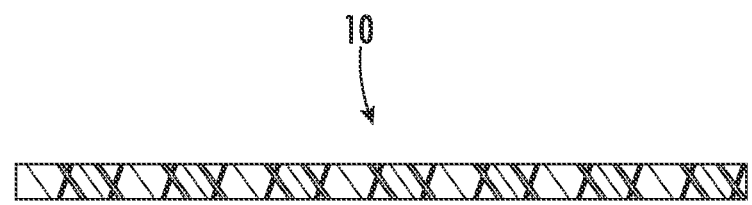

The embodiments described herein demonstrate a mold design that makes it possible to directly mold a tetrahedral-octahedral honeycomb lattice for use in commercial applications. Methods of making the product and the resulting product also are described.

In some cases, the product is a one-piece core or sheet comprising a lattice of material (including but not limited to a thermoplastic resin, thermoset material, thermoplastic elastomer, carbon fiber, metals, including but not limited to aluminum, steel, cardboard, rubber, concrete or any other material suitable for applications requiring an engineered structure) where the lattice is comprised of intersecting rows of parallel slats of material oriented along 3 distinct and intersecting sets of parallel planes, such that any 3 of the slat planes which are not parallel intersect to form an equilateral, regular tetrahedron. Non-limiting examples of suitable thermoplastic materials include polymers such as polyethylenes, polypropylenes, polyvinyl chlorides, nylons, ABS, polylactic acid, acrylics, polycarbonates, polystyrenes, polyethers, polyphenylenes, as well as copolymers and terpolymers of the same. Non-limiting examples of suitable thermoset materials include polymers such as natural and synthetic rubber, vinyl esters, polyesters, thermosetting acrylic resins, polyurethanes and epoxies. Non-limiting examples of suitable thermoplastic elastomers include olefinic thermoplastic elastomers, styrene block copolymers, thermoplastic copolyesters, and thermoplastic polyamides. Fillers and other additives can be included with the polymeric materials. The polymeric material can be a foam, and can molded using structural foam molding or another suitable technique.

The adjacent parallel slats are separated by a constant distance, xo, where xo is the same for all of the adjacent parallel slats oriented across all 3 distinct sets of parallel planes. For a top view, see FIG. 3 below.

Definitions

Platonic Solid: A polyhedron constructed of congruent, regular polygonal faces. The same number of faces must meet at each vertex of the faces of the polyhedron. The regular congruent tetrahedron and the regular congruent octahedron are both Platonic solids.

Regular Convex Tetrahedron (RCT): A platonic solid having 4 regular triangular faces.

Irregular Tetrahedron: A tetrahedron with 4 triangular faces, at least one of which is not an equilateral triangle. An irregular tetrahedron has six edges and four vertices.

Regular Convex Octahedron (RCO): A platonic solid having 8 regular triangular faces.

Irregular Octahedron: An octahedron with 8 triangular faces, at least one of which is not an equilateral triangle. An irregular octahedron has twelve edges and six vertices.

Pyramid: One half of an RCO comprised of a square base and 4 of the 8 regular triangular faces of the RCO defining the sides. Two pyramids with adjoining square bases form an RCO.

Tessellation: A pattern of shapes that fit perfectly together (mathisfun.com). A tessellation of tetrahedrons and octahedrons can be formed by alternating the octahedrons with tetrahedrons in successive offsetting rows where half of the tetrahedrons have their vertices pointed downward and half have their vertices pointing upward. The faces of the tetrahedrons and octahedrons form multiple parallel linear faces across the tessellation oriented in only 3 of the non-horizontal directions corresponding to the three non-base faces of any/all of the tetrahedrons. These parallel linear faces define slats that make up the lattice that is molded to become the final Tetrahedral-Octahedral Honeycomb lattice core material.

Tetrahedral-Octahedral Honeycomb: A tessellation of RCT and RCO where the faces are congruent. The focus of this document is a 3 dimensional, single layered tessellation of RCT and RCO.

Tetrahedral—Octahedral Honeycomb Lattice: The space falling between the RCO and RCT in a Tetrahedral-Octahedral tessellation. This is the space into which material is injected to mold the Tetrahedral-Octahedral Honeycomb lattice. Alternatively, it is the space left void to form a lattice when the objective is to create a lattice of space for uniformly disbursing liquids, gases or other flowing materials.

Dihedral Angle: The angle between two intersecting planes. The dihedral angle of a regular convex tetrahedron or a regular convex octahedron is the interior angle between two adjacent face planes. The dihedral angle of a regular convex tetrahedron is 70.53 degrees. The dihedral angle of a regular convex octahedron is 109.47 degrees. The dihedral angle of a right regular pyramid between the square base and a triangular side is 54.735 degrees.

Isotropic: Exhibiting properties with the same values when measured along axes in all directions (Merriam Webster); in physics, an object or substance having a physical property that has the same value when measured in different directions (Oxford Dictionaries).

One-piece: Formed as a unitary component in a molding process, without requiring lamination or adhesion of two or more sub-parts.

Sheet: A three dimensional lattice with planar or curved top and bottom faces.

The product comprises a one-piece Tetrahedral-Octahedral Honeycomb Lattice Core, because the negative space between the intersecting slats comprising the lattice are alternating rows of tetrahedra and octahedra. The rows of tetrahedra alternate between being pointed upwards and pointed downwards. These alternating rows of tetrahedra and octahedra form a tetrahedral-octahedral tessellation as the width of the lattice slats converges on 0. Conversely, as the space between the platonic solids forming the tetrahedral-octahedral tessellation is expanded, material can be injected or otherwise inserted into the space to form a Tetrahedral-Octahedral Honeycomb Lattice. The Lattice that is formed makes a highly desirable, quasi-isotropic, rigid core material. Importantly, the core geometry is inherently rigid, independent of being sandwiched between surface and base layers in a laminate structure. So as a result, it can enhance the rigidity of a composite laminate when used as a core, versus other core materials structured around alternative geometries.

The strength of the core, for any given material, is a function of the spacing between the slats and the width of the slats themselves, in addition to the material from which the core is made. The height of the core is primarily a function of the distance between the slats ($x_o$). That said, by shaving or truncating the top and bottom of the lattice structure, the lattice height can be reduced and weight removed. By increasing the width of the slats, the loss of strength due to truncation can be compensated for, albeit while adding additional weight. If truncated, the negative space of the lattice forms alternating truncated tetrahedra and octahedra. By varying the core material, the width of the slats, the distance between slats, the size of the tetrahedrons and octahedrons, and the degree of truncation, the dimensions of the core can be adapted to the unique rigidity, height, weight and other engineering needs of each manufactured application.

Truncation provides other benefits as well: It can reduce the pressures required to mold the core; and it can provide additional surface area for bonding when the core is used in laminates.

By virtue of being one piece, the lattice also can serve as a delivery vehicle for liquids, gases, and other molecular and atomic particles if the lattice is defined by a vacuum or gas or permeable substance constrained by the aforementioned tessellation of truncated or non-truncated tetrahedra and octahedral elements. While in the manufacturing of a core, material would in most instances be removed from the negative space, in applications such as a delivery vehicle, material can be introduced into the negative space, leaving the core area available to disperse the substance being delivered. In essence, one would "mold" the mold, and assemble the two halves leaving the lattice as the empty space.

In other applications the core can be formed and then the negative space can be filled with a different material with complementary properties. For example, the core can be made of a rigid, solid material and foam can be injected into the negative space to provide insulation to a refrigerated space. Alternatively, the foam can be molded to resemble the two halves of the mold and then the two halves can be assembled around the lattice.

In some embodiments, the tetrahedral and/or octahedral shapes (non-truncated or truncated) may be irregular in order to provide for efficient molding and/or mold release. In some embodiments, the tetrahedral and/or octahedral shapes (non-truncated or truncated) may be irregular in order to provide for desired lattice wall thicknesses, and/or to enhance or compensate for properties of the material or materials used to form the lattice, and/or to introduce a curvature.

Methods

Another embodiment described herein is an elegant and low cost method of producing a Tetrahedral-Octahedral Honeycomb lattice. The method employs an appropriately designed injection mold or compression mold (casting). The core, sheet, or other structure can be manufactured in any moldable material (plastic, aluminum, steel, or concrete, for example) which would make a desirable lattice core structure.

One embodiment is a method of producing a core, sheet or other material that involves truncating the top and bottom of the structure to open up the peaks of the tetrahedral and octahedral elements. This provides more surface area for bonding laminated sheets of material and reduces the pressure required to mold the lattice. It also reduces the weight of the lattice and provides a means of adjusting the height. The manufacturing process of the modified lattice is, in many respects, the same as the original core-lattice structure.

The product described herein can be used in place of conventional honeycomb material. While a hexagonal honeycomb laminate handles compressive forces well, the geometry of hexagonal honeycomb does not handle shear and a variety of other forces well. To compensate, a variety of materials have been employed to produce the hexagonal honeycomb structure (for example aluminum and Kevlar) to compensate for these shortcomings. Also, a variety of sheet materials have been laminated to honeycomb cores to improve the composite structures' performance under the anticipated conditions of use. The result has been an increase in manufacturing complexity and cost.

Furthermore, low-margin, cost sensitive applications that could benefit from the high strength to weight ratio of a honeycomb-type core material have been precluded from using conventional honeycomb technology due to cost considerations. A principal objective of the method described herein is to manufacture a core material which possesses inherent quasi-isotropic or isotropic properties, and/or enhanced performance properties including tension, compression, shear, bending and torsional rigidity. But unlike prior known manufacturing techniques, the embodiments described herein seek to produce this core material directly, in one piece, and at a substantially reduced cost.

The mold to produce the lattice fills the voids in the lattice while leaving space for the resin or other structural material to flow and harden into lattice. Filling the Regular Convex Tetrahedral voids is straightforward. The top and bottom mold components simply need to have offsetting parallel rows of RCT with the triangular base of the RCT built into the mold base and top, and one side of all of the RCT in the row aligned along a common plane. It is noted that the planes of alignment of the sides of the RCT are at an angle to the base or top of the lattice equal to the dihedral angle of an RCT (70.53 degrees).

The method of filling the octahedral voids which alternate with the RCT in the tetrahedral rows of the lattice is non-trivial but elegant. Note that the RCO alternating with the RCT have a face which is also aligned along the common plane of the tetrahedral faces in the same row. The disclosed embodiments are based on the fact that an RCO is composed of two Pyramids (see definition above) with Pyramids' adjacent square bases aligned on a diagonal plane. As noted in the definitions above, the triangular sides of the Pyramids are congruent to the faces of the RCT. As a result, when the 2 sides of the mold are released at an angle equal to the diagonal orientation of the square bases of the Pyramids, the void-filling Pyramids can be removed from the top and bottom of the RCO leaving the lattice.

In another method, the tetrahedral-octahedral honeycomb lattice is printed using an additive manufacturing process. When this technique is used, in embodiments, post-treatment and or fiber-reinforcement techniques are employed to ensure that the resulting product exhibits quasi-isotropic or isotropic qualities.

Figure 3:
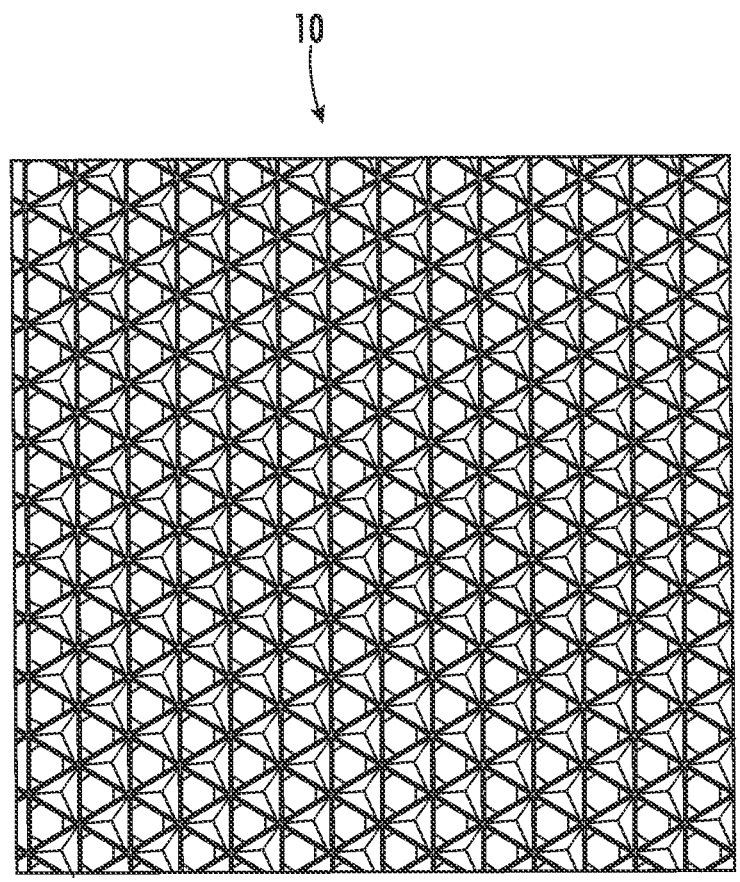
FIG. 3 is a top plan view of the sheet of FIG. 1.

Referring to the drawings, FIG. 1 shows a perspective view of a sheet 10 according to a first embodiment. The sheet is three dimensional. FIGS. 2A-2G show other views of the sheet of FIG. 1. The sheet has substantially isotropic properties due to its geometry. FIG. 3 shows a top plan view of the sheet. The bottom plan view looks generally the same as the top plan view.

Figure 4:
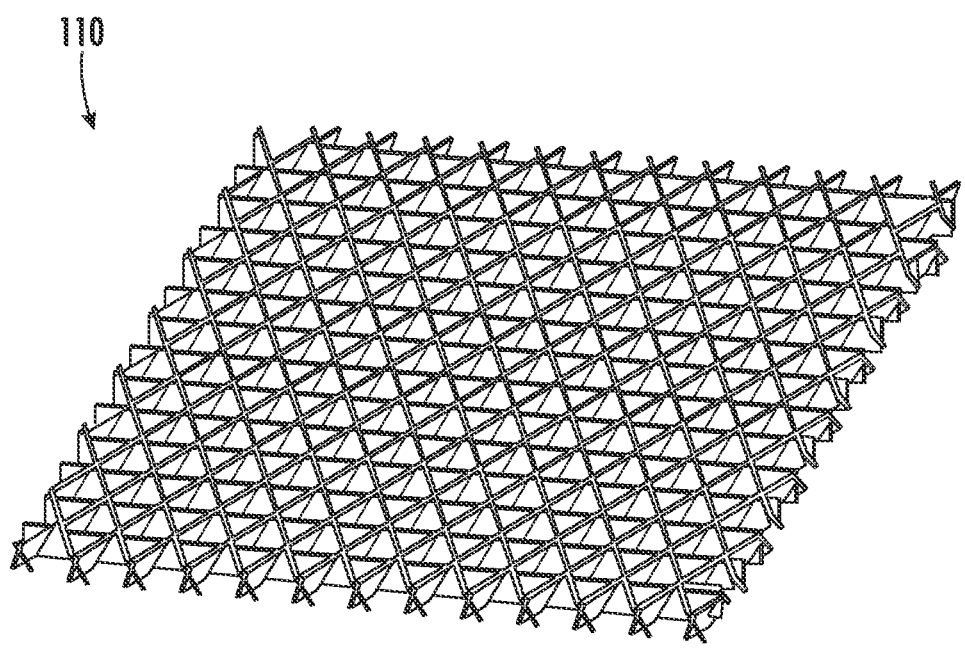
FIG. 4 shows a perspective view of a sheet in accordance with a second embodiment, having a truncated tetrahedral configuration.
Figure 5A:
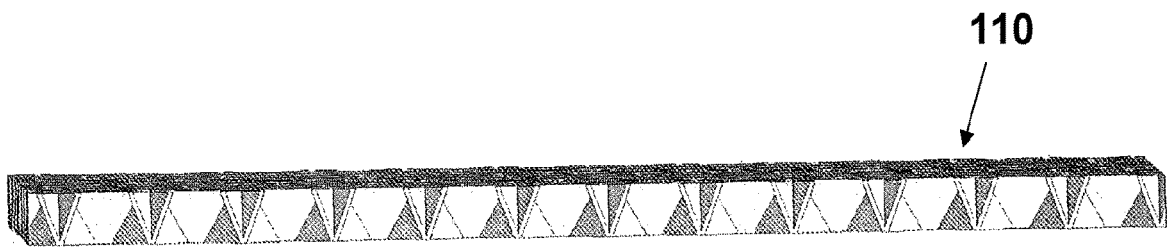
FIG. 5A-5B show symmetric side views of the sheet of FIG. 4.
Figure 5B:
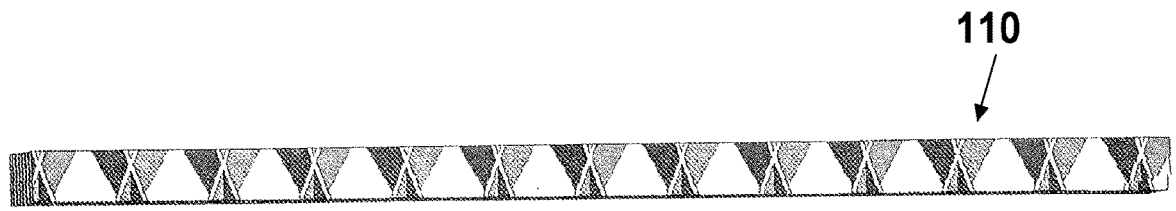
Figure 5C:
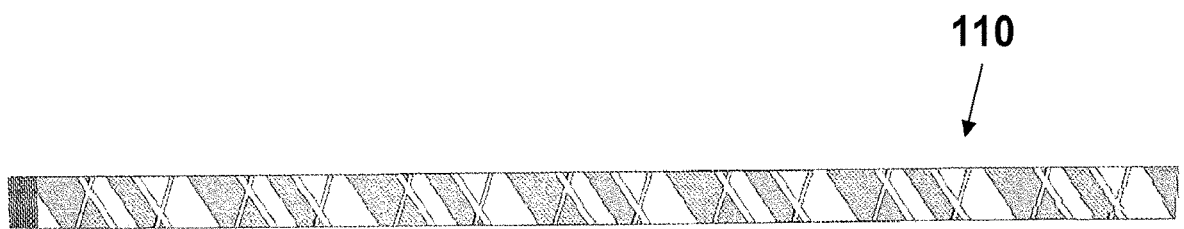
FIGS. 5C-5D show asymmetric side views of the sheet of FIG. 4.
Figure 5D:
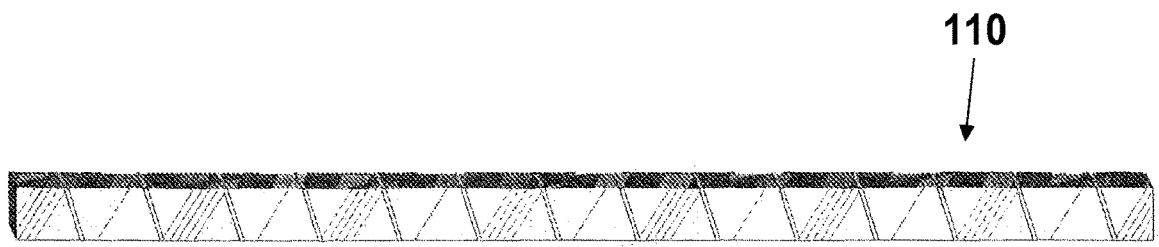
Figure 5E:
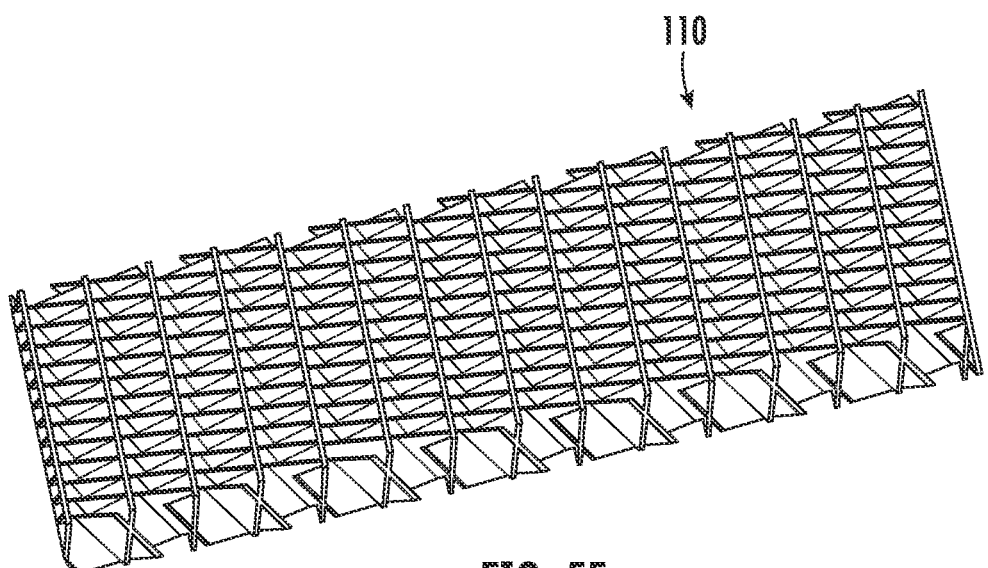
FIG. 5E is a side perspective view of the sheet of FIG. 4.
Figure 6:
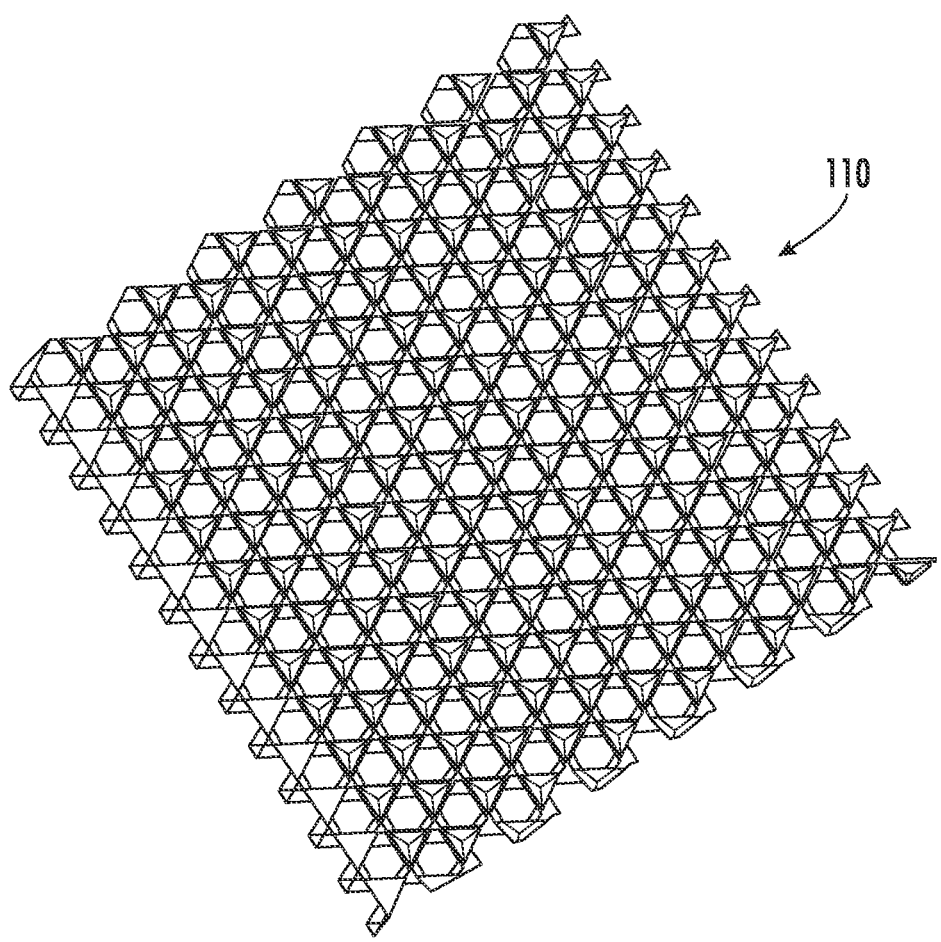
FIG. 6 is a top plan view of the sheet of FIG. 4.

FIGS. 4-6 illustrate a second embodiment of a sheet 110 in which the tetrahedral and octahedral portions are truncated along the opposite first and second faces. It is noted that in other embodiments, one face has truncated tetrahedrons and/or octahedrons while the other face does not. Furthermore, in embodiments, there may be truncation of only some of the tetrahedral portions and/or octahedral portions within a single sheet. In certain embodiments, some of the tetrahedral portions are truncated while other tetrahedral portions are not truncated. In certain cases, some of the octahedral portions are truncated while other octahedral portions are not truncated. In some embodiments, some or all of the tetrahedral portions are truncated while the octahedral portions are not truncated. In certain embodiments, some or all of the octahedral portions are truncated while the tetrahedral portions are not truncated.

Figure 7A:
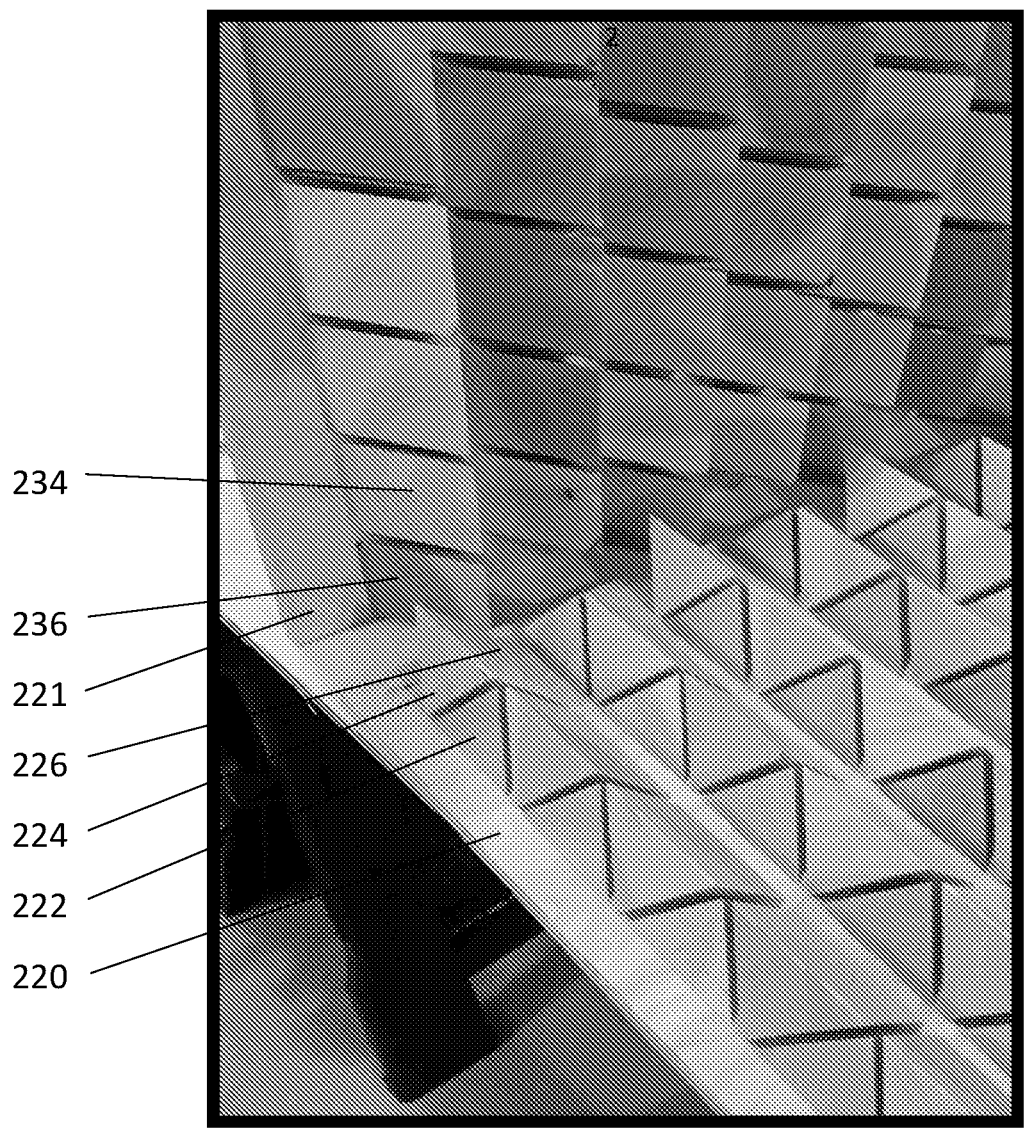
FIG. 7A is a perspective view of a prototype of a first embodiment of two halves of a mold for forming a sheet, the halves being positioned next to one another in a perpendicular arrangement.
Figure 7B:
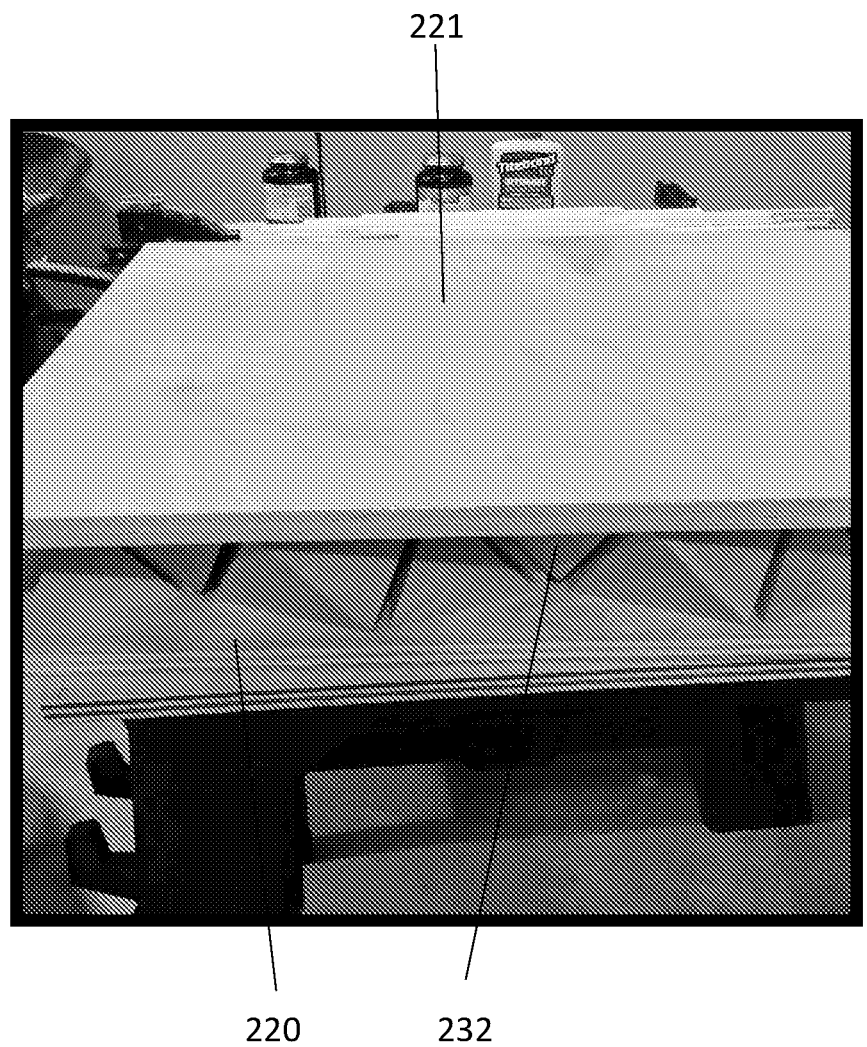
FIG. 7B shows the mold of FIG. 7A in a closed position.
Figure 7C:
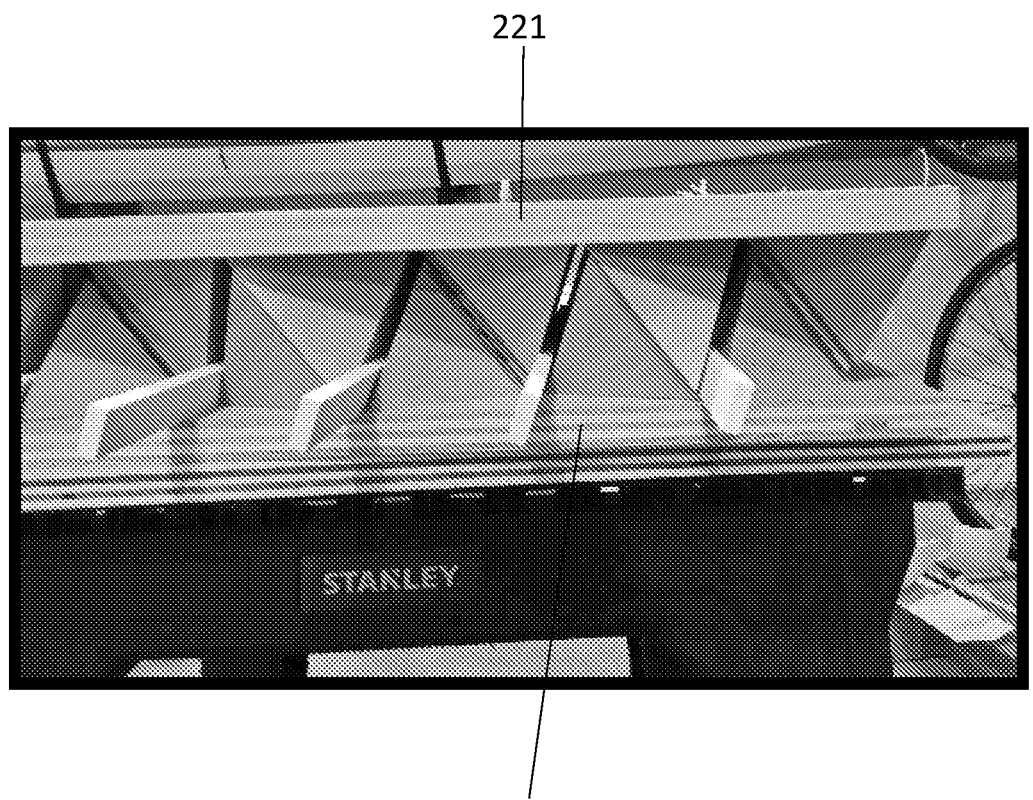
FIG. 7C shows the mold of FIG. 7A in a closed position with slats showing the spaces where sheet material fills the mold.

FIGS. 7A-7E show perspective views of a first mold section 220 and a second mold section 221 that can be used to mold the sheet shown in FIGS. 1-3. The first mold section 220 has a series of aligned tetrahedrons 222. In between the tetrahedrons 222, a series of aligned regular square pyramids 224 are positioned. Each pyramid 224 is positioned sideways, with the base 226 of the square pyramid extending at an angle relative to a horizontal plane. In FIG. 7A, the top mold half 221 is disposed vertically to show the inner side. The top mold half 221 include a plurality of aligned regular square pyramids 234, each with a base 236. The tetrahedrons 232 on the top mold half 221 can be seen in FIG. 7B. FIG. 7B shows the mold of FIG. 7A in a closed position. The space between the protrusions on the top mold half and bottom mold half are filled with moldable material in order to form the lattice. FIG. 7C shows the mold in a closed position with slats showing the spaces where sheet material fills the mold. The square bases of the pyramids on the top mold half are in contact with the square bases of the pyramids on the bottom mold half, and the combination of the upper and lower pyramid pairs forms the octahedral spaces in the lattices.

Figure 7D:
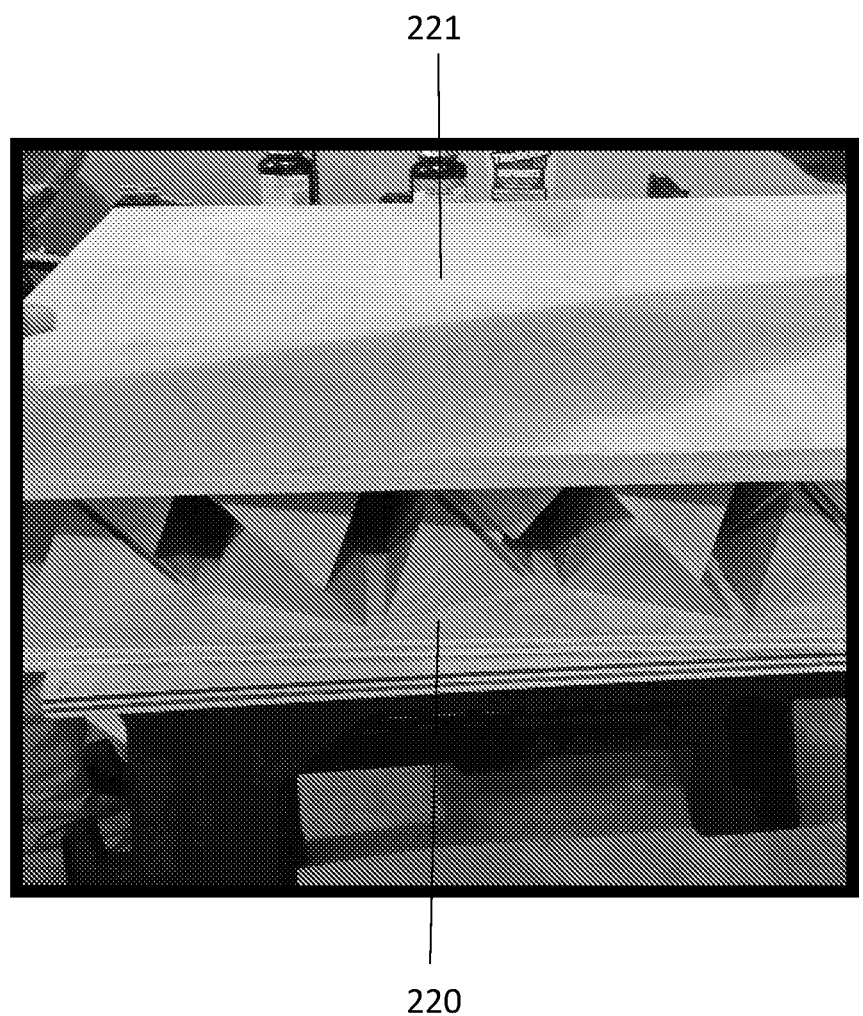
FIG. 7D shows the mold of FIG. 7A in a partially open position.
Figure 7E:
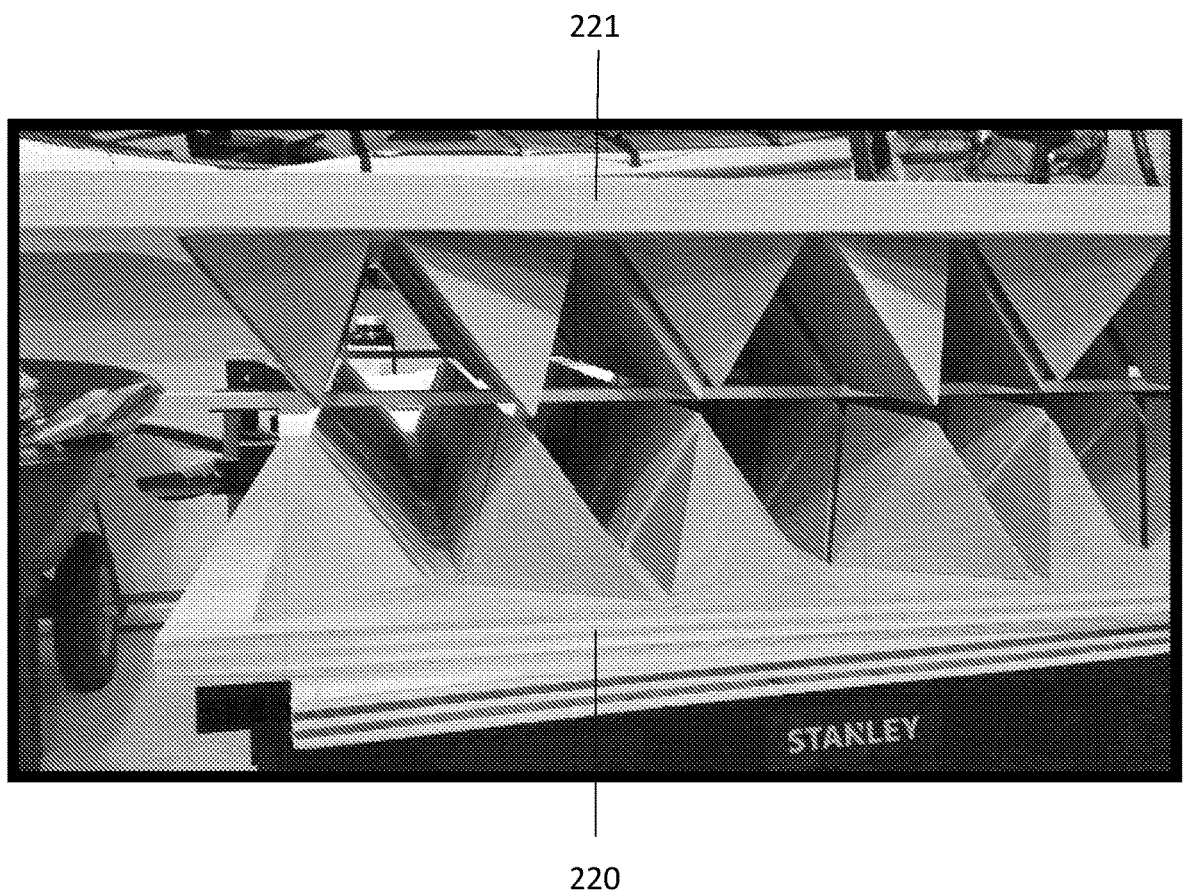
FIG. 7E shows the mold of FIG. 7A in an open position.

FIG. 7D shows the mold of FIG. 7A in a partially open position. As can be seen, the direction of pull is parallel to the plane of the pyramid bases. FIG. 7E shows the mold of FIG. 7A in an open position.

Figure 8:
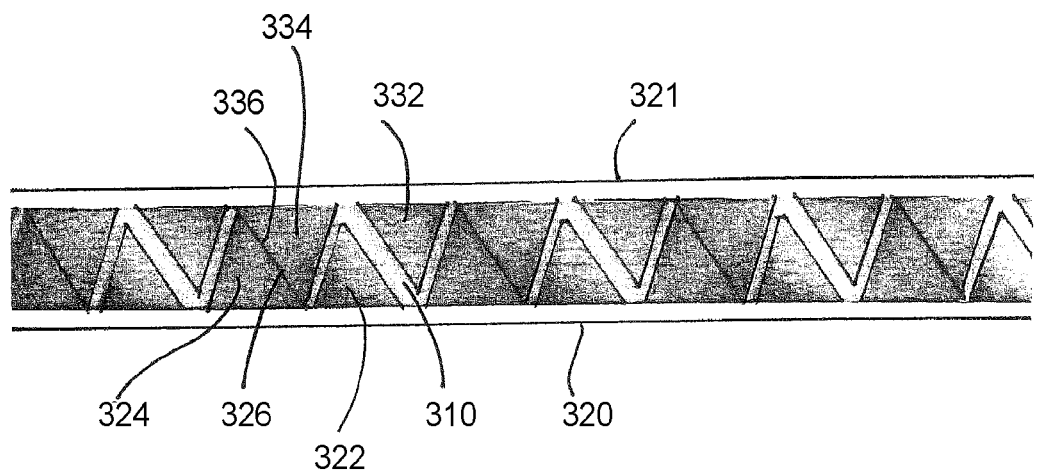
FIG. 8 is a schematic side sectional view of two mold halves similar to that shown in FIG. 7 with a molded sheet therebetween.

FIG. 8 shows a schematic view of a closed mold during molding. The first mold section 320 has alternating tetrahedrons 322 and inclined pyramids 324 (pyramids that are positioned sideways, with one triangular face parallel to the length of the first mold section 320, and the square base 326 of the pyramid extending diagonally upward relative to the length of the first mold section 320), as can be seen in FIGS. 7A-7D. The second mold section 321 also includes a plurality of alternating tetrahedrons 332 and inclined pyramids 334. The second mold section 321 is configured to be complementary in order that, substantially throughout the mold, a base 326 of the inclined pyramid 324 is in substantially complete contact with a base 336 of the inclined pyramid 334 with no space therebetween, such that an octahedral void is created during molding. Thus, the material used to form the sheet 310 is prevented from moving between the two rectangular bases of each pyramid 324 and its complementary pyramid 334 during molding.

Figure 9:
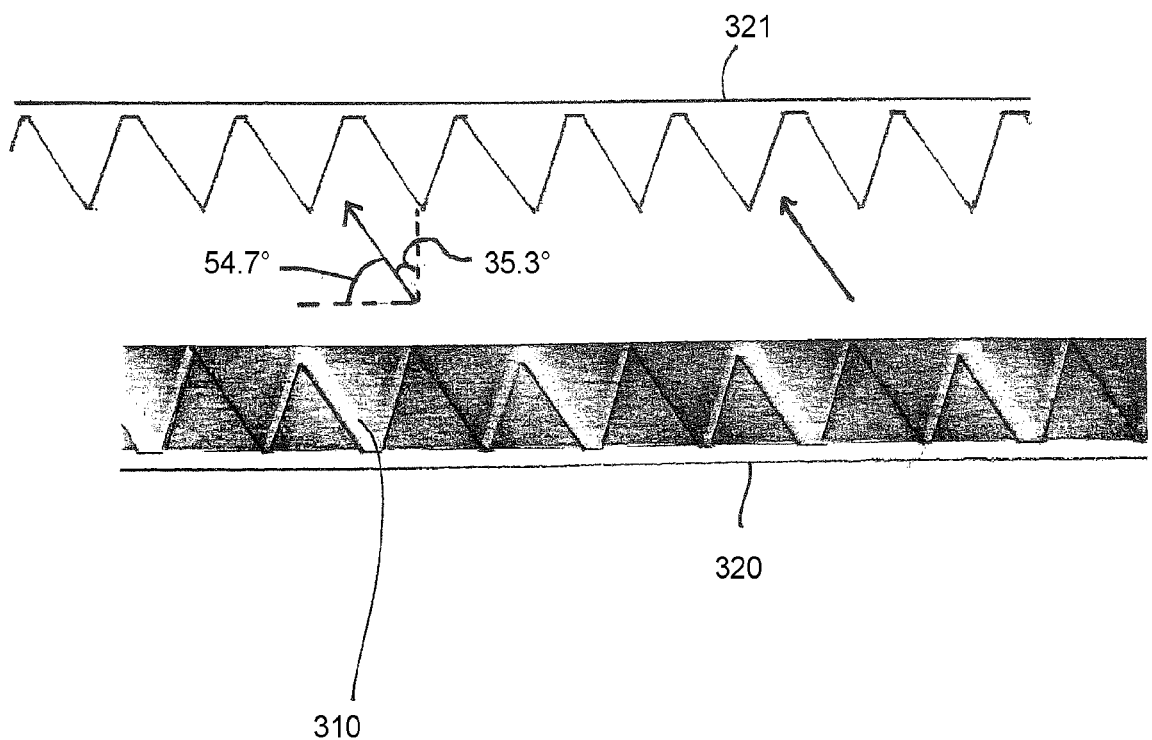
FIG. 9 is a schematic side sectional view showing diagonally upward movement of the first mold section in order to remove the sheet.
Figure 10:
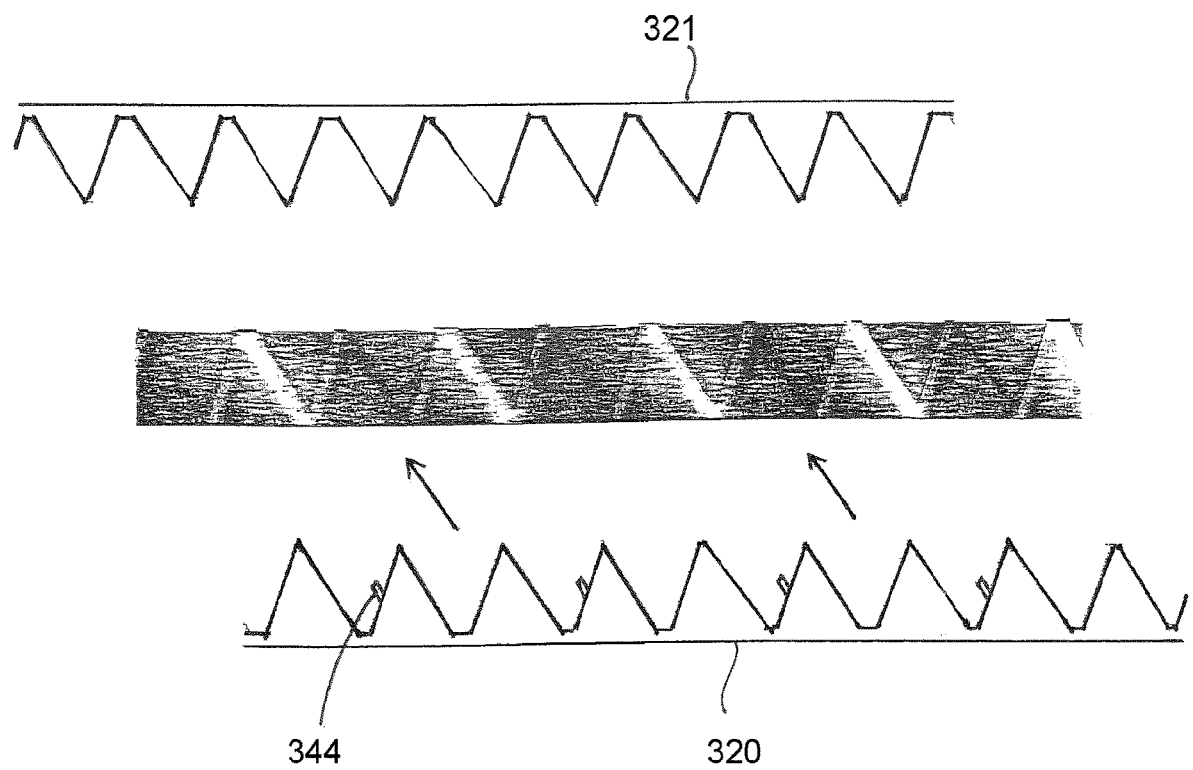
FIG. 10 is a schematic side sectional view showing the angled direction of ejection of the sheet from the second mold half.
Figure 11:
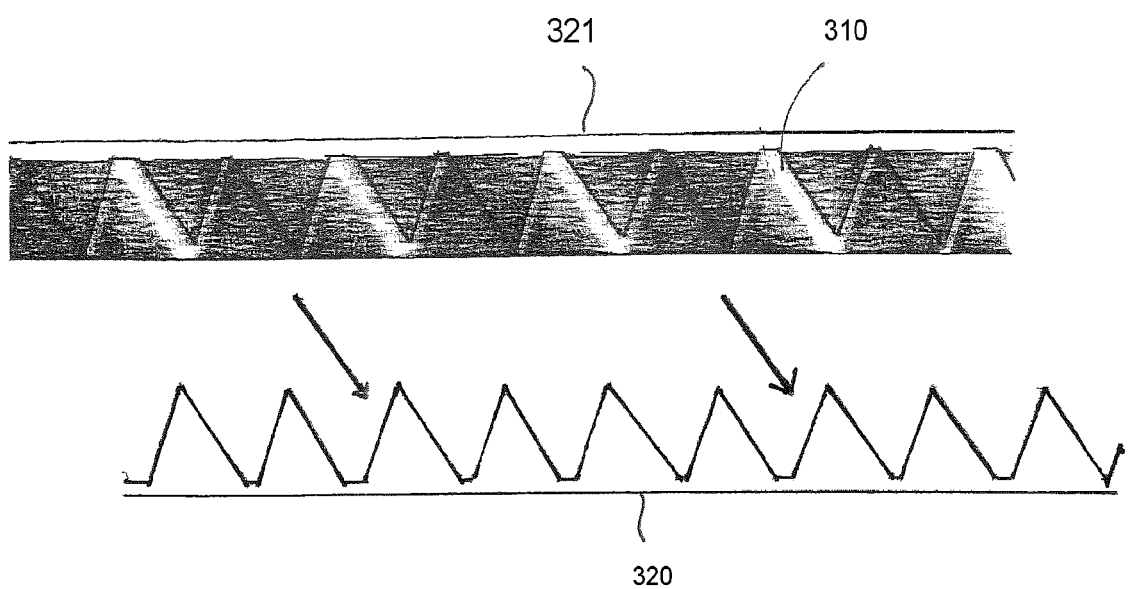
FIG. 11 is a schematic side section view showing movement of the lower mold section away from the molded sheet.
Figure 12A:
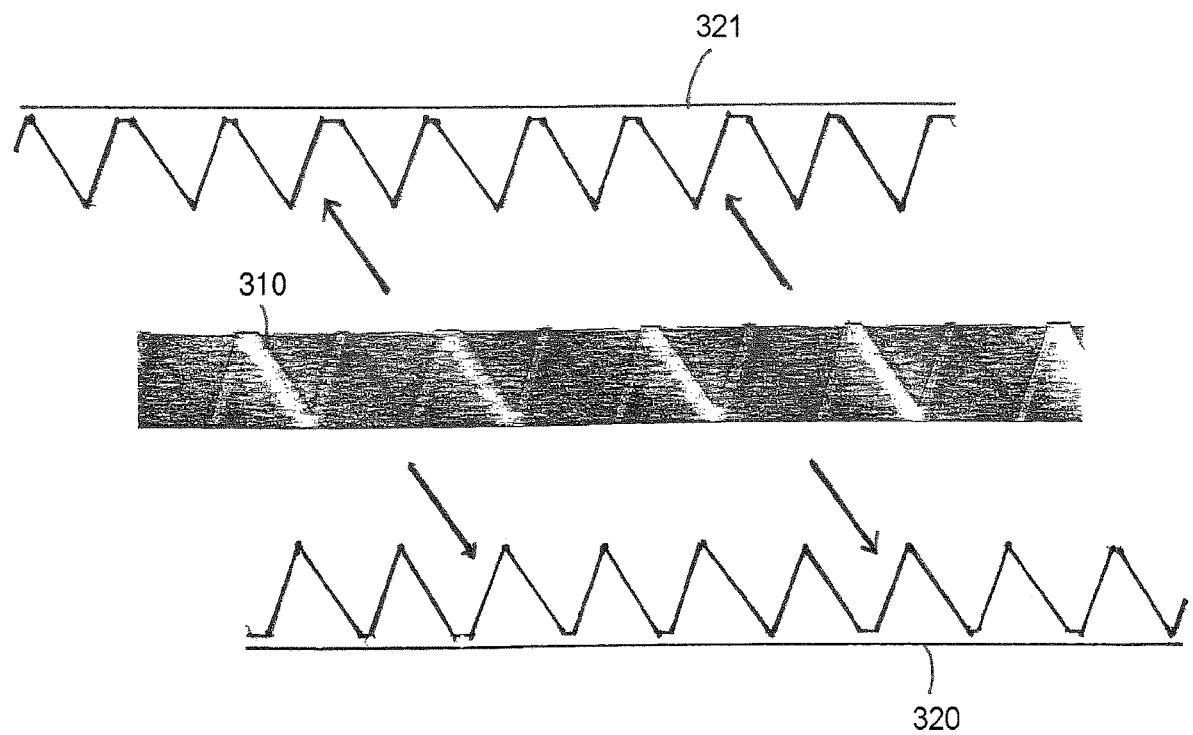
FIG. 12A is a schematic side sectional view showing simultaneous movement of the two mold halves away from the sheet.

Movement of the mold parts and the molded sheet can be seen in FIGS. 9-12. To remove a molded sheet 310, one or both mold sections are moved, and the direction of movement is at an angle relative to the plane of the sheet 310. As is shown in FIGS. 9, 11 and 12, the mold sections are removed in directions that are parallel to the bases of the base-to-base pyramids that define the octahedral portion of the mold when the mold is in a closed position. For a right regular pyramid, the dihedral angle between the plane of the square base and the plane of a triangular side is 54.735 degrees. This is half of the dihedral angle of a regular convex octahedron, which as indicated above, is 109.47 degrees. (Stated in general terms, because one triangular side of the regular square pyramid is coplanar with the mold base, the square base that is defined by each of the two pyramidal shapes that form one octahedron is angled relative to the plane of the mold base.) The upward and sideward direction that the second mold section 321 is moved when the mold is opened is about 35.3 degrees away from a vertical direction, and about 54.7 degrees away from a horizontal direction. Similarly, if the first mold section 320 is moved in a downward and sideward direction, as in the embodiment shown in FIG. 11, the first mold section 320 is moved in a direction that is about 35.3 degrees away from a vertical direction and about 54.7 degrees away from a horizontal direction. In the configuration shown in FIG. 12A, the second mold section 321 moves in a "left" sideward direction and the first mold section 320 moves in a "right" sideward direction. As is sometimes the case in molding operations, the line of draw can be slightly different from a direct line of draw in order to facilitate removal of the molded piece.

Figure 12B:
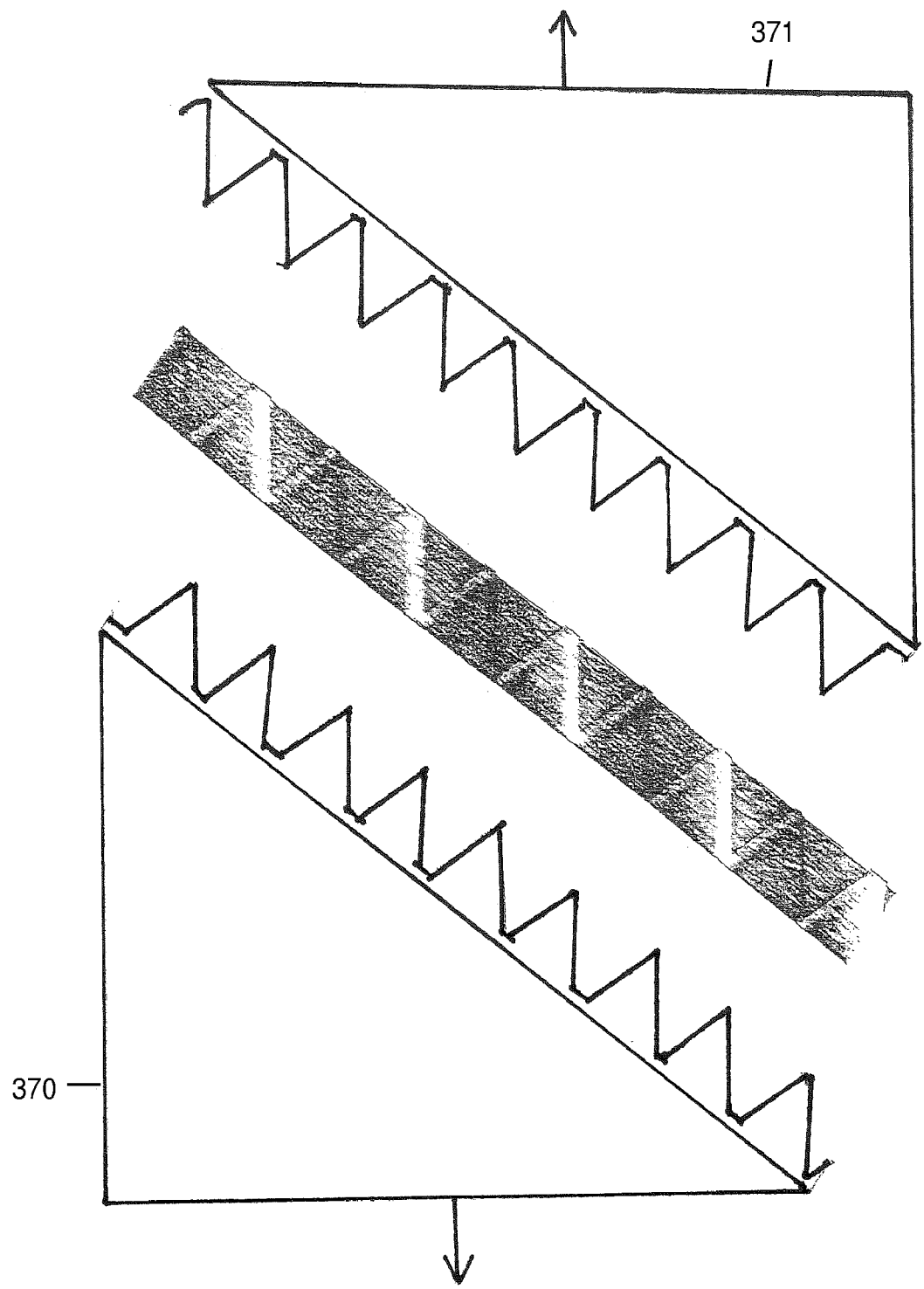
FIG. 12B is a schematic side view of a mold with vertical pulls for forming the sheet of FIG. 1.

For cases in which both mold sections are moved away from the sheet, the second mold section 321 can be removed first (FIG. 9), the first mold section 320 can be removed first (FIG. 11), or both mold sections can be removed at the same time (FIG. 12A, and also FIG. 12B, which shows first mold section 370 and second mold section 371). For cases in which one mold section is removed and the mold includes a sheet ejector (see, for example, FIG. 10, which includes retractable ejector pins 344), the sheet is ejected in generally the same angular direction as the movement of the mold section that is first removed. As is shown in FIG. 10, if the second (upper) mold section 321 is removed first, in the direction shown in FIG. 9, the sheet 310 can be ejected from the first (lower) mold section 320 in a direction generally parallel to the direction of movement of the second mold section 321.

In embodiments, the second mold section can be moved, before, after, or at the same time as the movement of the first mold section. Furthermore, in some cases, (see FIG. 11), if the first mold section 320 is moved away from the sheet, the sheet 310 will drop from the second mold section 321 due to gravity. In other embodiments, after the first (lower) mold section 320 is moved away from the sheet 310, the sheet is ejected from the second (upper) mold section 321 in a direction parallel to the angular movement of the first mold section 320 using a suitable ejection technique.

FIGS. 12A and 12B show simultaneous movement of the upper and lower mold sections away from the molded sheet. FIG. 12A shows an embodiment in which the sheet is positioned horizontally during molding. FIG. 12B shows an embodiment in which the sheet is positioned at an angle during molding, with the direction of pull of the upper mold half being vertically up and the direction of pull of the lower mold half being vertically down.

Figure 13:
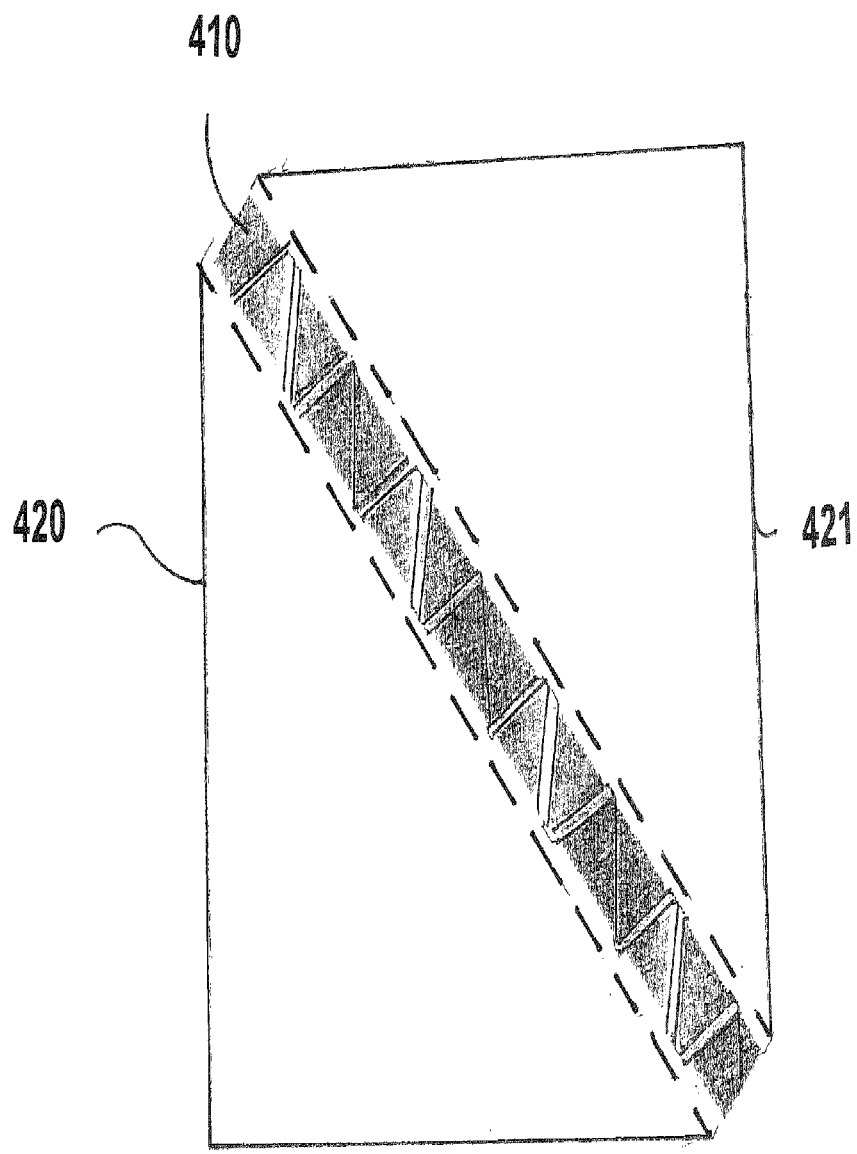
FIG. 13 is a schematic side view of two mold halves of a vertical pull mold for forming a sheet of truncated configuration with a sheet molded therebetween.
Figure 14:
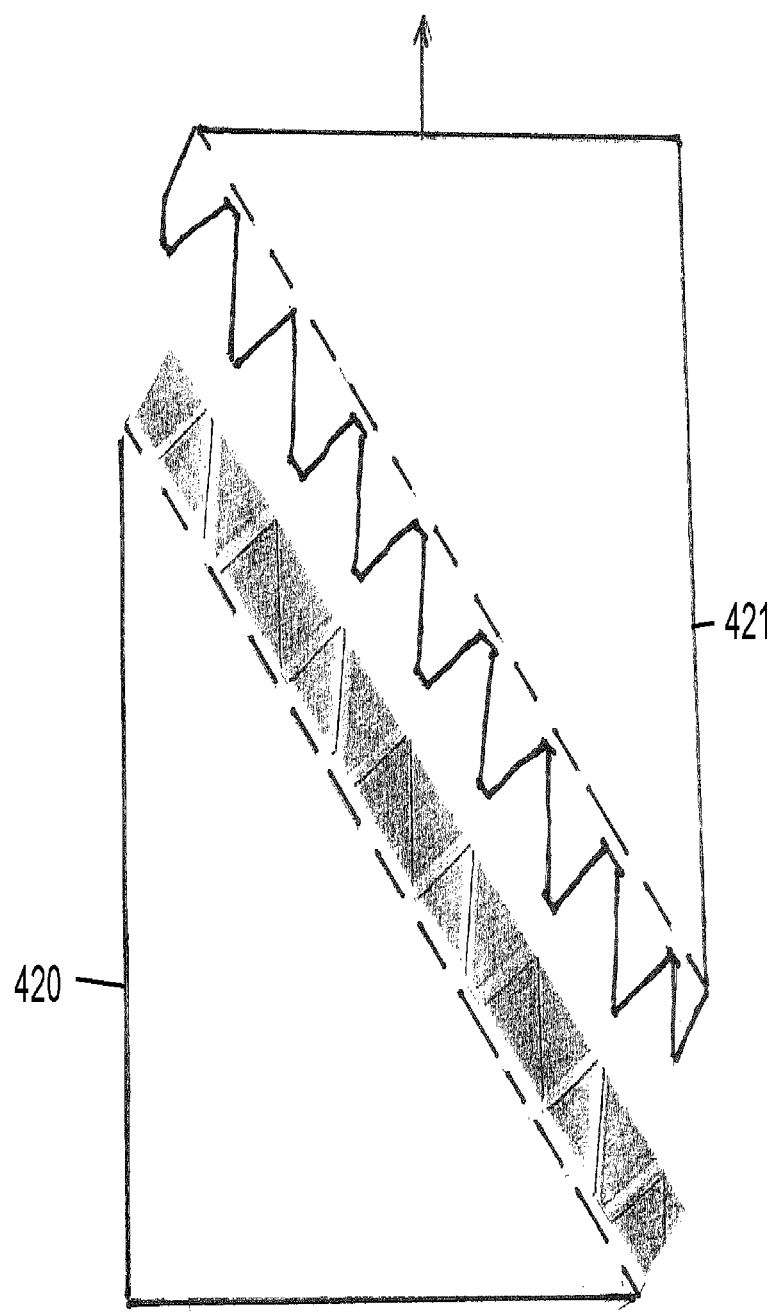
FIG. 14 is a schematic side view showing upward movement of the second mold half in order to remove the sheet.
Figure 15:
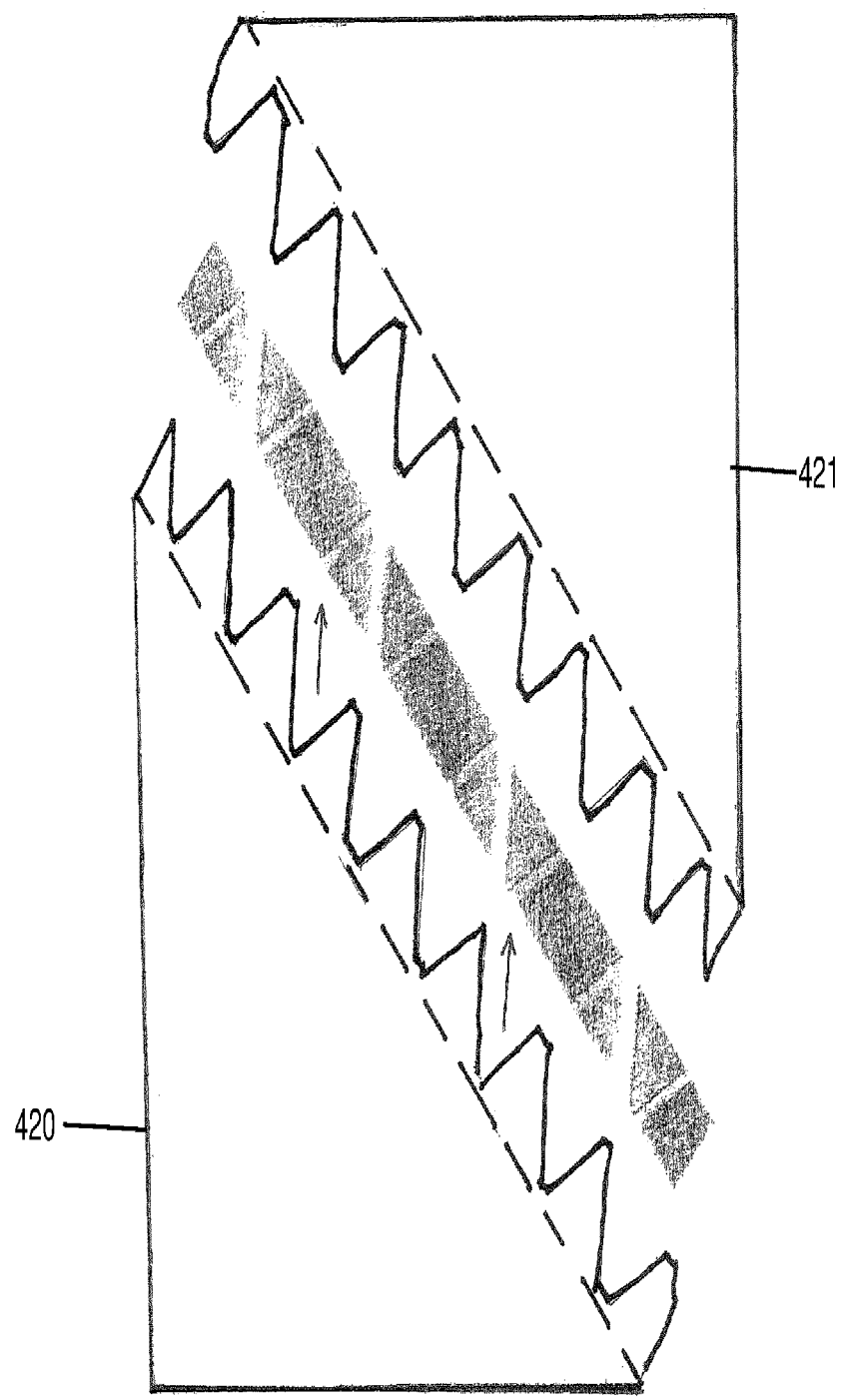
FIG. 15 is a schematic side view showing the vertical direction of ejection of the sheet from the second mold half.
Figure 16:
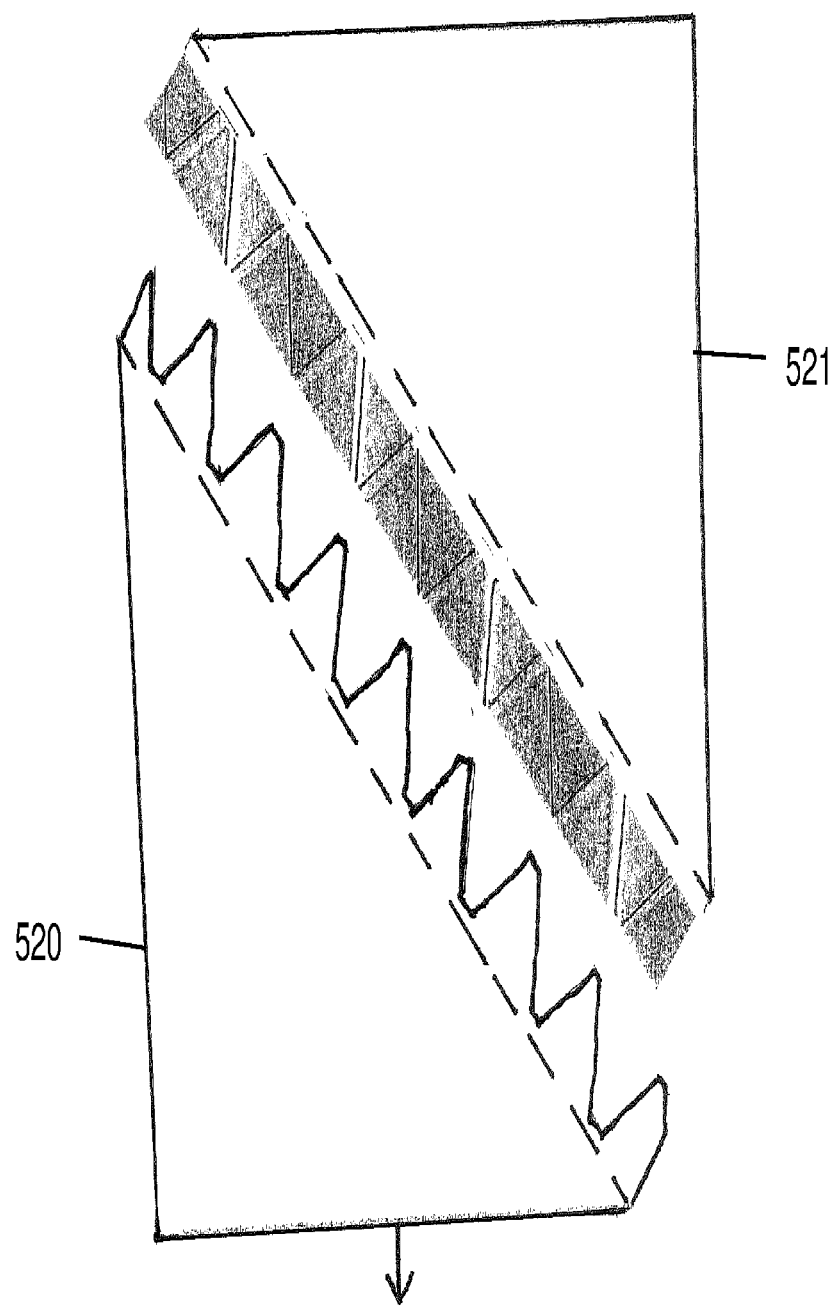
FIG. 16 is a schematic side view showing movement of the first mold section away from the sheet.
Figure 17:
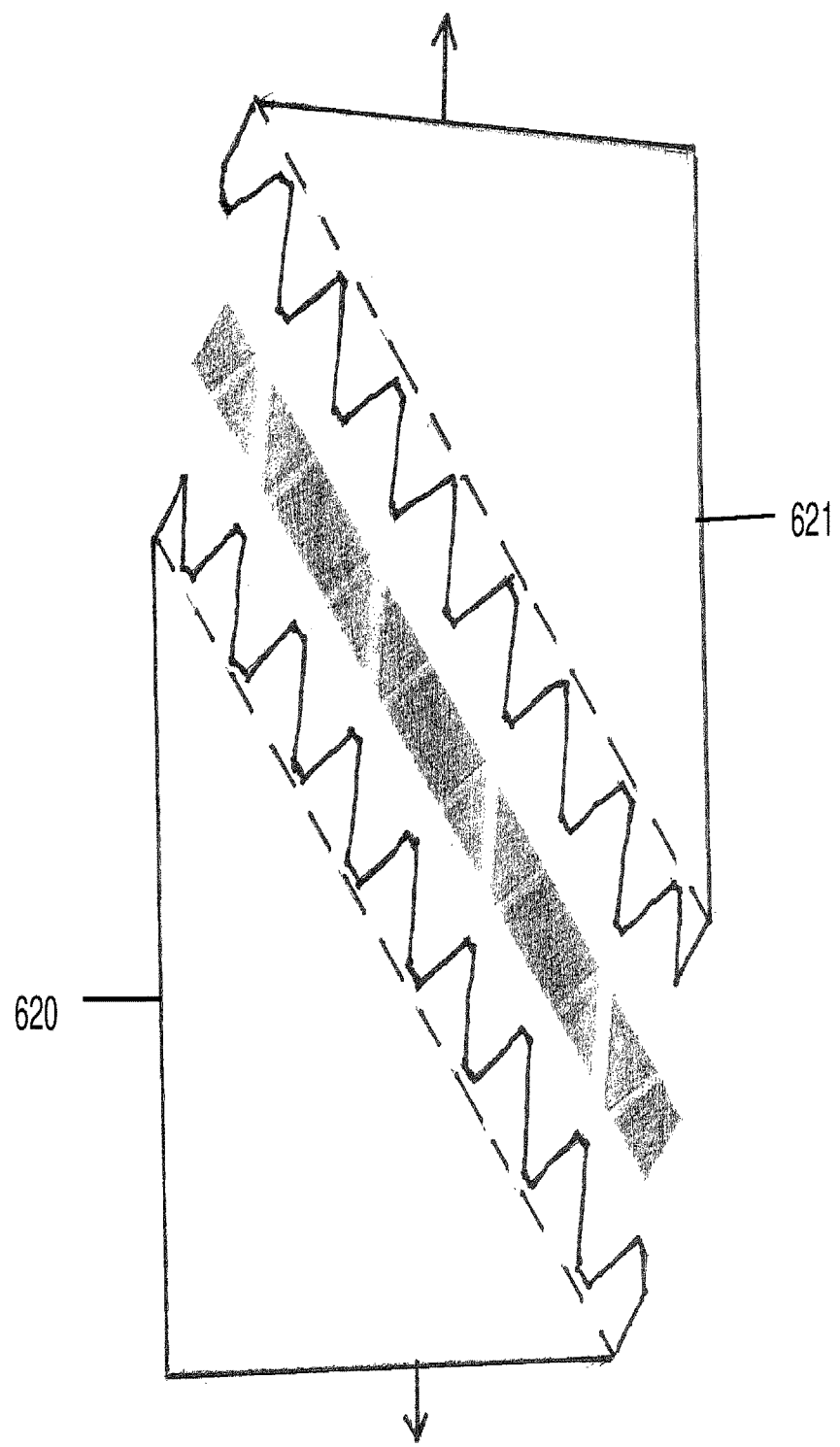
FIG. 17 is a schematic side sectional view showing simultaneous movement of the two mold halves away from the sheet.

FIGS. 13-17 show a mold that is generally similar that that of FIGS. 7-12 except that the tetrahedral and/or octahedral portions of the mold are truncated, and the mold has vertical pulls such that the sheet is angled during molding. Movement of the first mold section 420, the second mold section 421 and the sheets 410 are similar to the movements described above in connection with FIGS. 7-11, except that the planes of molded sheets are positioned at an angle relative to a horizontal plane. More specifically, FIG. 13 shows closed mold sections 420 and 421. FIG. 14 shows the upward movement of second mold section 421. FIG. 15 shows upward movement of the sheet off of first mold section 420. FIG. 16 shows downward movement of first mold section 520. FIG. 17 shows downward movement of first mold section 620 and upward movement of second mold section 621.

Figure 18:
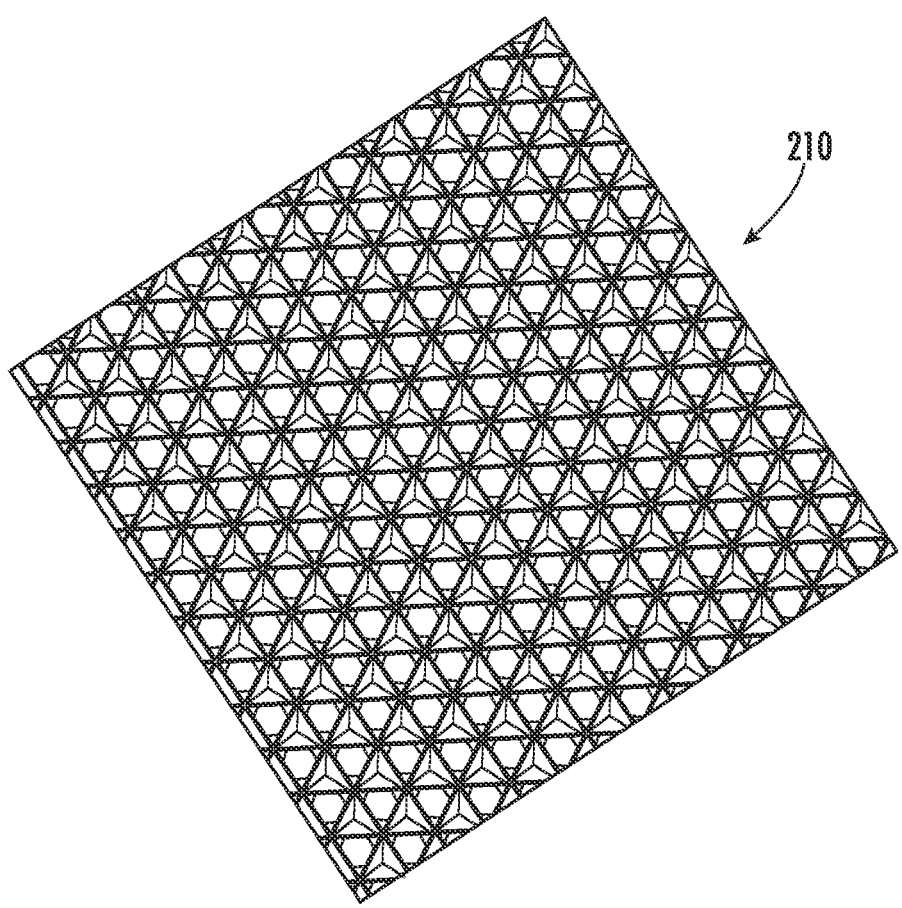
FIG. 18 is a top view of an embodiment of sheet material having closed sides.

FIG. 18 depicts a top view of an embodiment of sheet material 210 having closed sides around the perimeter of the four-sided lattice.

In embodiments, the lattice is post-treated to impart desired characteristics. Non-limiting examples of post-treatment techniques include coating, impregnating, compressing, curing, post-curing, heating, cooling, wetting, abrading, solvent treatment, washing, rinsing, grinding, irradiating, sintering, bending and/or sterilizing.

A Method of Making a Mold

Figure 7F:
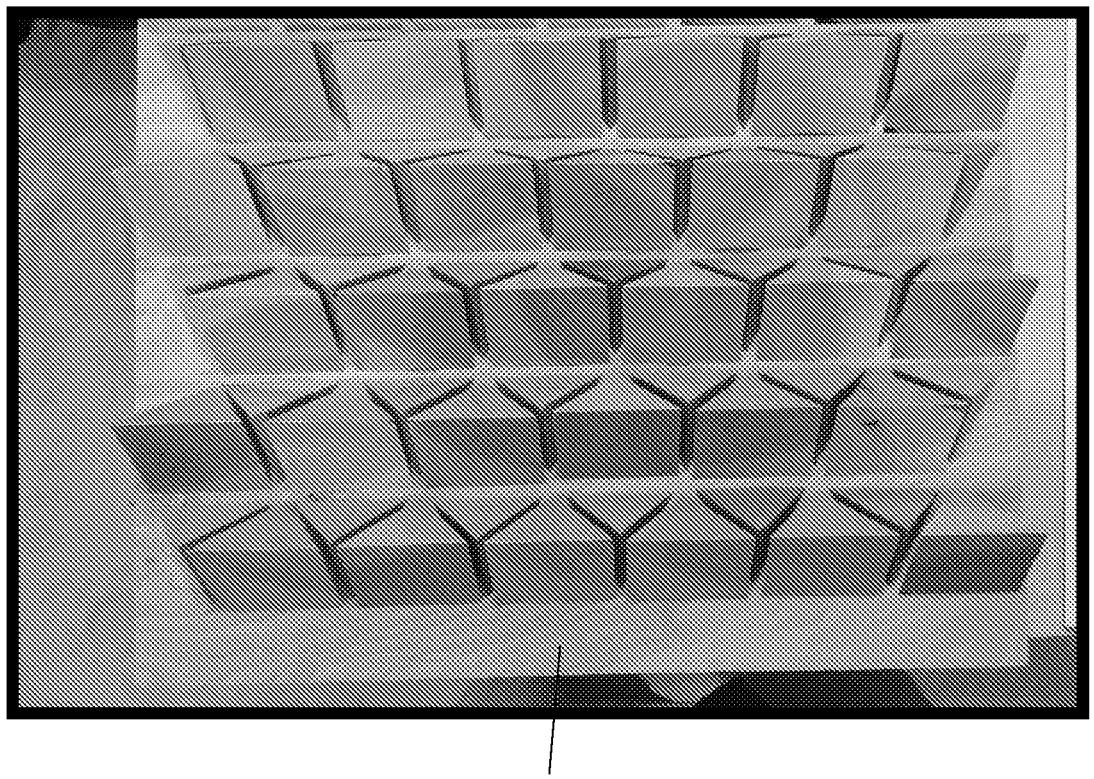
FIG. 7F is a top view of a mold half showing the relative alignment of the tetrahedral and pyramidal portions.

In the description of the technique for molding a single piece tetrahedral-octahedral honeycomb core structure, the focus was on the individual elements of the negative space comprising the mold (the tetrahedra and pyramid-pairs forming the octahedra). In embodiments, the actual machining of the mold is much more elegant. In one embodiment, given a block of aluminum, steel or other material from which the mold-halves are to be machined, the removal of material is along 4 sets of parallel planes, 3 of which are defined by the non-horizontal sides of the tetrahedra (relative to the sheet plane), and one which is defined by the base plane of the pyramids which form ½ of the octahedra (see FIG. 7F). The base plane of the pyramids and one of the planes of the tetrahedra run along a common axis, albeit at different angles which intersect at the base of a given mold-half. As can be seen in FIG. 7F, the space between these two planes forms a wedge which eventually is machined out in its entirety to make room for the top half of the mold. The width of the material removed along the parallel planes defined by the tetrahedra corresponds to the desired width of the lattice comprising the honeycomb.

These machined cuts form ½ of the mold. If this is the bottom half of the mold, then the top half is a mirror image of the bottom half and is machined the same way. Details on mold material insertion/injection and end-product extraction will vary depending upon the materials and methods of the application. Details on the construction of the sides of the mold also will vary depending upon the materials and methods of the application being manufactured. In embodiments, machining is performed with a router.

In other embodiments, the top and bottom halves of the mold can be made using additive manufacturing Additive Manufacturing Recent advances in software technology have enabled the manufacture of a variety of product designs through the use of additive manufacturing. ISO/ASTM52900-15 defines seven categories of additive manufacturing processes as being examples of 3D printing, namely Binder Jetting, Directed Energy Deposition, Material Extrusion, Material Jetting, Powder Bed Fusion, Sheet Lamination and Vat Photopolymerization. The sheet material and core material described above can be made using additive manufacturing. In embodiments, the additive manufacturing technique that is used produces the material as a one-piece component. That is, no lamination, soldering or welding is required of two or more separate parts. In some cases, the production driver used in additive manufacturing is organized around the tetrahedral and octahedral elements, in order that the additive manufacturing device can "print" the sheet material around separate octahedral and tetrahedral elements.

If vat polymerization is used, the liquid or molten polymer is irradiated, often using UV light, to convert that liquid or molten material into a solid. If stereolithography is used, a stereolithographic machine converts the liquid or molten plastic into a solid.

Polymeric materials used in 3D printing include a variety of thermoplastic and thermoset materials, and composites incorporating fillers, including carbon or metallic materials.

In some cases, the sheet material is fabricated using a 3D printer that uses fused filaments. In embodiments, the 3D printed sheet material is post-treated to further improve its tensile strength, such as by coating the sheet material with a coating applied by spraying, dipping or the like. In embodiments, the material used in additive manufacturing is a fiber-reinforced polymer, thereby imparting additional strength, including favorable tensile strength and stiffness, to the final product.

Non-limiting examples of polymers that can be used in 3D printing include acrylonitrile butadiene styrene (ABS) and polylactic acid (PLA), These polymers can be fiber reinforced, with carbon fibers or another suitable type of fiber.

One embodiment disclosed herein is a lightweight, strong sheet material formed by additive manufacturing. In embodiments, the sheet material is carbon-reinforced material in order to impart favorable stiffness and tensile strength to the sheet material while making it lightweight. In some cases, the build direction of the material, i.e. the direction in which the nozzle moves when forming each layer, is parallel to the direction in which the greatest tensile strength is desired, thereby reducing the likelihood of breakage.

3D printed thermoset polymers can be cured during manufacture by photopolymerization, such as with UV light, or can be post-cured, such as by heating.

In embodiments, the 3D printed sheet material is post-processed using a suitable solvent, such as acetone or methyl ethyl ketone. The solvent can be used to smooth the sheet material or hold pieces together. In vacuum treatment, heat is applied to evaporate the solvent so that it interacts with the surfaces of the sheet material in a closed container.

In embodiments, internal tetrahedral and octahedral supports are used during printing to support "overhanging" features of the sheet material, such as diagonal walls. These supports may have the configuration of the mold halves shown in the photographs included herein.

Other types of post-treatment include application of a strengthening thin layer of a polymeric coating composition, as well as the types of post-treatments described above.

EXAMPLES

Example 1

Simulations were conducted to determine physical properties of tetrahedral-octahedral honeycomb lattice formed from polycarbonate with an aluminum skin on the top and bottom surfaces. The samples had a length of 3 inches, a width of 8 inches, and a total thickness of 0.468-0.500 inches including the skin. Some of the samples had truncated tetrahedral-octahedral honeycomb lattice. The sample dimensions and the finite element analysis test results for Beam Load and Shear Load simulations are shown on FIGS. 19 and 20 below. "Cell thk (in)" indicates cell wall thickness in inches.

Beam loading test were conducted as per MIL-C-7438. Shear loading tests were conducted as per ASTM C-273. Cell size was measured along one side of the triangles from the wall centers, as viewed from the top of the lattice.

Prophetic Example 2

Tetrahedral-octahedral honeycomb core samples measuring 1 foot by 1 foot by ½ inch with a wall thickness of about 0.045 inch are made from aluminum. The lattice optionally can be sandwiched between two aluminum skin sheets.

Prophetic Example 3

Tetrahedral-octahedral honeycomb core samples measuring 1 foot by 1 foot by ½ inch with a wall thickness of about 0.045 inch are made from stainless steel. The lattice optionally can be sandwiched between two aluminum skin sheets.

Prophetic Example 4

Tetrahedral-octahedral honeycomb core samples measuring 9 inches by 9 inches by ¾ inch with a wall thickness of about 0.045 inch are made from aramid fiber. The lattice optionally can be sandwiched between two aluminum skin sheets.

Prophetic Example 5

Tetrahedral-octahedral honeycomb core samples measuring 2 foot by 1 foot by ½ inch with a wall thickness of about 0.045 inch are made from Kevlar or Nomex aramid fiber. The lattice optionally can be sandwiched between two aluminum skin sheets.

Prophetic Example 6

Tetrahedral-octahedral honeycomb core samples measuring 2 foot by 1 foot by ½ inch with a wall thickness of about 0.045 inch are made from polypropylene. The lattice optionally can be sandwiched between two aluminum or stainless steel skin sheets.

Applications of the Tetrahedral—Octahedral Honeycomb Lattice—The lattice can be useful anywhere a lightweight, quasi-isotropic structural core material/laminate would be beneficial, including, but not limited to, the following:

1) Aerospace: Airplane Flooring, Bulkheads, Engine Turbine Blades, Hull
2) Trucking: Trailer siding, Refrigerated Trailer siding, Flooring, Doors
3) Building and Construction: Doors, Garage Doors, Walls, Concrete Cinderblocks
4) Shipping: Pallets, Corrugated Cardboard, Shipping Containers
5) Marine: Bulkheads, Doors, Flooring, Hull
6) Solar Panels—Backing Material Supporting Solar Receiver
7) Decorative—Lightweight, Rigid, Decorative Panel
8) Wind Energy—Wind Turbines
9) FEMA Trailers—Sides of lightweight FEMA Housing
10) Recreational Vehicles—Sides of Superlight RVs
11) Ballistic Protection—Ballistic Protection Panels for Military Vehicles
12) Unmanned Undersea Vehicles—Bulkheads, Hull, Flooring, Doors,
13) Rail—Floor, Bulkhead, Doors, Decorative Panels
14) Automotive—Ballistic Protection, Crash Panels, Floor Panels
15) Highway—Crash Barrels, Sign Backing
16) Advertising—Billboards
17) Other—Flat Panel TV, Lightweight Drywall Alternative, Alternative to Plywood, Stealth Benefits, Acoustic Dampening, Support for insulation integrated into voids
18) Dissipation of material like drugs through the lattice if the lattice area is left void and the mold structure is left in place to form the lattice-void. In this application, one would "mold" the two halves of the mold and then assemble the two halves to form the final product.

A number of alternatives, modifications, variations, or improvements therein may be subsequently made by those skilled in the art, which are also intended to be encompassed by the following claims.

What is claimed is:

1. An apparatus comprising:
a first portion with a base having a first set of tetrahedral and inclined pyramidal protrusions formed thereon, and a second portion with a base having a second set of tetrahedral and inclined pyramidal protrusions formed thereon,
wherein the first and second sets of tetrahedral and inclined pyramidal protrusions are complementary and positioned proximate one another, forming a lattice-shaped void therebetween, and
wherein the inclined pyramidal protrusions comprise a rectangular first surface portion and triangular second, third and fourth surface portions.

2. The apparatus of claim 1, wherein the first portion and the second portion comprise halves of an injection mold.

3. The apparatus of claim 1, wherein the first portion and the second portion comprise halves of a compression mold.

4. The apparatus of claim 1, wherein the first and second portions of the apparatus are configured to separate in opposite diagonal directions that are parallel to the plane of the rectangular first surface portions of the inclined pyramidal protrusions.

5. An apparatus comprising:
a first portion with a base having a first set of truncated tetrahedral and inclined truncated pyramidal protrusions formed thereon, and a second portion with a base having a second set of truncated tetrahedral and inclined truncated pyramidal protrusions formed thereon,
wherein the first and second sets of truncated tetrahedral and inclined truncated pyramidal protrusions are complementary and positioned proximate one another, forming a lattice-shaped void therebetween, and wherein the inclined truncated pyramidal protrusions comprise a rectangular first surface portion and truncated triangular second, third and fourth surface portions.

6. The apparatus of claim 5, wherein the first portion and the second portion comprise halves of an injection mold.

7. The apparatus of claim 5, wherein the first portion and the second portion comprise halves of a compression mold.

8. A method of making a component, comprising:
obtaining a mold comprising a first portion with a base having a first set of tetrahedral-type and inclined pyramidal-type protrusions formed thereon, and a second portion with a base having a second set of tetrahedral-type and inclined pyramidal-type protrusions formed thereon, wherein the inclined pyramidal protrusions comprise a rectangular first surface portion and triangular second, third and fourth surface portions, the first and second sets of tetrahedral-type and inclined pyramidal-type protrusions being complementary and when positioned proximate one another, forming a lattice-shaped void therebetween,
filling the mold with a liquid or molten moldable material,
allowing the moldable material to solidify to form the component, and
removing the component from the mold.

9. The method of claim 8, further comprising:
before removing the component from the mold, separating the first and second mold portions by moving each mold portion in a direction that is diagonal relative to the plane of the mold base.

10. The method of claim 8, wherein the moldable material comprises at least one of a thermoplastic material and a thermoset material.

11. The method of claim 8, further comprising post-treating the component.

12. The method of claim 11, wherein post-treating comprises at least one of coating, impregnating, compressing, curing, post-curing, heating, cooling, wetting, abrading, washing, rinsing, grinding, irradiating, sintering, bending and sterilizing.

13. The method of claim 11, wherein post-treating comprises coating the component with a polymeric composition.

14. The method of claim 8, wherein at least one of the first set of tetrahedral-type and inclined pyramidal-type protrusions and the second set of tetrahedral-type and inclined pyramidal-type protrusions are truncated.

15. The method of claim 14, wherein the moldable material comprises at least one of a thermoplastic and a thermoset material.

16. The method of claim 14, wherein the mold is an injection mold.

17. The method of claim 8, wherein the mold is an injection mold.

18. The method of claim 8, wherein the mold is a compression mold.

19. The method of claim 8, further comprising mounting the component between first and second generally planar sheets.

20. The method of claim 19, wherein the first and second planar sheets comprise at least one of a metal, a thermoplastic material and a thermoset material.

* * * * *